(12) United States Patent
Hashimoto et al.

(10) Patent No.: US 8,769,406 B2
(45) Date of Patent: Jul. 1, 2014

(54) IMAGE DISPLAY APPARATUS CAPABLE OF DISPLAYING IMAGE WHILE RETAINING CONFIDENTIALITY

(75) Inventors: Hideyuki Hashimoto, Toyokawa (JP); Takeshi Hibino, Toyokawa (JP); Kana Yamauchi, Toyohashi (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 827 days.

(21) Appl. No.: 11/595,999

(22) Filed: Nov. 13, 2006

(65) Prior Publication Data

US 2008/0037040 A1 Feb. 14, 2008

(30) Foreign Application Priority Data

Aug. 14, 2006 (JP) .................................. 2006-221125

(51) Int. Cl.
*G06F 17/27* (2006.01)
(52) U.S. Cl.
USPC ........... 715/273; 715/203; 715/204; 715/271; 715/274; 715/275; 715/768
(58) Field of Classification Search
USPC .................. 715/203–204, 271, 273–275, 768
See application file for complete search history.

(56) References Cited

U.S. PATENT DOCUMENTS

| 5,524,197 | A | * | 6/1996 | Uya et al. ...................... 715/781 |
| 5,568,598 | A | * | 10/1996 | Mack et al. .................... 345/639 |
| 5,581,682 | A | * | 12/1996 | Anderson et al. ............. 715/236 |
| 6,628,417 | B1 | * | 9/2003 | Naito et al. ................... 358/1.15 |
| 6,631,495 | B2 | * | 10/2003 | Kato et al. ..................... 715/255 |
| 7,046,258 | B1 | * | 5/2006 | Naito et al. ................... 345/619 |
| 7,423,667 | B2 | * | 9/2008 | Hayasaka ....................... 348/143 |
| 7,428,701 | B1 | * | 9/2008 | Gavin et al. ................... 715/243 |
| 7,805,673 | B2 | * | 9/2010 | der Quaeler et al. ......... 715/255 |
| 2005/0231421 | A1 | * | 10/2005 | Fleisher et al. ............... 342/179 |

(Continued)

FOREIGN PATENT DOCUMENTS

| CN | 1037975 | 12/1989 |
| EP | 0 337 752 | 10/1989 |

(Continued)

OTHER PUBLICATIONS

Tomasz Muldner and Peter W. Steele, C as a Second Language for Native Speakers of Pascal, Addison-Wesley Publishing Company, Inc, 1988, pp. 135-138, 431-433.*

(Continued)

*Primary Examiner* — Doug Hutton, Jr.
*Assistant Examiner* — Andrew Dyer
(74) *Attorney, Agent, or Firm* — Buchanan Ingersoll & Rooney PC

(57) ABSTRACT

In setting, by using a format, a non-display region in image data obtained by an image reading unit, a format location information input unit writes in the image data, an image representing information on access to a format storage unit in an external apparatus where a format to be used has been stored. In displaying the image data, a format location information extraction unit extracts the format location information by extracting the image from the image data. A format obtaining unit obtains the format by accessing the format storage unit based on the information. An image modification unit uses the obtained format to modify the image data such that the designated region is displayed in an invisible manner.

15 Claims, 26 Drawing Sheets

(56) References Cited

U.S. PATENT DOCUMENTS

| | | | |
|---|---|---|---|
| 2005/0257273 A1* | 11/2005 | Naito et al. | 726/26 |
| 2005/0270371 A1* | 12/2005 | Sablak | 348/143 |
| 2005/0270372 A1* | 12/2005 | Henninger, III | 348/143 |
| 2006/0072778 A1* | 4/2006 | Harrington | 382/100 |
| 2006/0170669 A1* | 8/2006 | Walker et al. | 345/418 |

FOREIGN PATENT DOCUMENTS

| | | | |
|---|---|---|---|
| JP | 02-048857 | | 2/1990 |
| JP | 02-287493 | | 11/1990 |
| JP | 06-290251 | | 10/1994 |
| JP | 09-034989 | | 2/1997 |
| JP | 11-052942 | | 2/1999 |
| JP | 11-265409 | | 9/1999 |
| JP | 2000-112823 | * | 4/2000 |
| JP | 2000-112823 A | | 4/2000 |
| JP | 2000-172780 | | 6/2000 |
| JP | 2000-312284 | | 11/2000 |
| JP | 2000-349999 | * | 12/2000 |
| JP | 2000-349999 A | | 12/2000 |
| JP | 2001-134413 | | 5/2001 |
| JP | 2002-207725 | * | 7/2002 |
| JP | 2002-207725 A | | 7/2002 |
| JP | 2004-062587 | | 2/2004 |
| JP | 2006-139622 | * | 6/2006 |
| JP | 2006-139622 A | | 6/2006 |
| JP | 2006-189933 | * | 7/2006 |
| JP | 2006-189933 A | | 7/2006 |

OTHER PUBLICATIONS

Mark Soper, Absolute Beginner's Guide to Home Networking, Que Publishing, 2004, "What is a Network?"*

Machine Translation of JP 2006-189933, as cited on the Information Disclosure Statement dated Oct. 16, 2007; pp. 1-27.*

Notice of Grounds of Rejection, mailed Aug. 26, 2008, directed to counterpart Japanese Patent Application No. 2006-221125; 8 pages.

Chinese Office Action mailed Sep. 25, 2009, directed to counterpart Chinese Application No. 200710002148.9; 13 pages.

* cited by examiner

FIG.8

| MANUFACTURER NAME | DETERMINATION | UNIT PRICE | QUALITY | PAST RECORD |
|---|---|---|---|---|
| A | ○ | 110 | B | YES |
| B | △ | 111 | A | YES |
| C | ◎ | 108 | B | YES |
| D | ○ | 110 | B | NO |
| E | △ | 107 | C | NO |

TITLE: PRICE LIST

PRICE OF PART 001

FIG.9

| MANUFACTURER NAME | DETERMINATION | UNIT PRICE | QUALITY | PAST RECORD |
|---|---|---|---|---|
| A | ○ | 110 | B | YES |
| B | △ | 111 | A | YES |
| C | ◎ | 108 | B | YES |
| D | ○ | 110 | B | NO |
| E | △ | 107 | C | NO |

TITLE: PRICE LIST

PRICE OF PART 001

FIG.10

TITLE: PRICE LIST

PRICE OF PART 001

| MANUFACTURER NAME | DETERMINATION | UNIT PRICE | QUALITY | PAST RECORD |
|---|---|---|---|---|
| A | ○ | 110 | B | YES |
| B | △ | 111 | A | YES |
| C | ◎ | 108 | B | YES |
| D | ○ | 110 | B | NO |
| E | △ | 107 | C | NO |
| | | | | |
| | | | | |
| | | | | |
| | | | | |
| | | | | |
| | | | | |
| | | | | |

FIG.11

| MANUFACTURER NAME | DETERMINATION | UNIT PRICE | QUALITY | PAST RECORD |
|---|---|---|---|---|
| A | ○ | 110 | B | YES |
| B | △ | 111 | A | YES |
| C | ◎ | 108 | B | YES |
| D | ○ | 110 | B | NO |
| E | △ | 107 | C | NO |

TITLE: PRICE LIST

PRICE OF PART 001

TITLE: PRICE LIST

220

PRICE OF PART 001

| MANUFACTURER NAME | DETERMINATION | UNIT PRICE | QUALITY | PAST RECORD |
|---|---|---|---|---|
| A | ○ | 110 | B | YES |
| B | △ | 111 | A | YES |
| C | ◎ | 108 | B | YES |
| D | ○ | 110 | B | NO |
| E | △ | 107 | C | NO |
| | | | | |
| | | | | |
| | | | | |
| | | | | |
| | | | | |
| | | | | |
| | | | | |

FIG.14

TITLE: PRICE LIST

PRICE OF PART 001

| MANUFACTURER NAME | DETERMINATION | UNIT PRICE | QUALITY | PAST RECORD |
|---|---|---|---|---|
| A | ○ | 110 |  | YES |
| B | △ | 111 | B | YES |
| C | ◎ | 108 | B | YES |
| D | ○ | 110 | B | NO |
| E | △ | 107 | C | NO |

FIG.17

| MANUFACTURER NAME | DETERMINATION | UNIT PRICE | QUALITY | PAST RECORD |
|---|---|---|---|---|
| A | ○ | 110 | B | YES |
| B | △ | 111 | A | YES |
| C | ◎ | 108 | B | YES |
| D | ○ | 110 | B | NO |
| E | △ | 107 | C | NO |

TITLE: PRICE LIST — 301

PRICE OF PART 001 — 303

TITLE: PRICE LIST

PRICE OF PART 001

| MANUFACTURER NAME | DETERMINATION | UNIT PRICE | QUALITY | PAST RECORD |
|---|---|---|---|---|
| A | ○ | 110 | B | YES |
| B | △ | 111 | A | YES |
| C | ◎ | 108 | B | YES |
| D | ○ | 110 | B | NO |
| E | △ | 107 | C | NO |
| | | | | |
| | | | | |
| | | | | |
| | | | | |
| | | | | |
| | | | | |
| | | | | |

FIG.23

| MANUFACTURER NAME | | UNIT PRICE | | |
|---|---|---|---|---|
| A | | 110 | | |
| B | | 111 | | |
| C | | 108 | | |
| D | | 110 | | |
| E | | 107 | | |

TITLE: PRICE LIST — 301

PRICE OF PART 001 — 303

200

305  307  309  311  313

IMAGE DISPLAY APPARATUS CAPABLE OF DISPLAYING IMAGE WHILE RETAINING CONFIDENTIALITY

This application is based on Japanese Patent Application No. 2006-221125 filed with the Japan Patent Office on Aug. 14, 2006, the entire content of which is hereby incorporated by reference.

BACKGROUND OF THE INVENTION

1. Field of the Invention

The present invention relates to an image display apparatus, an image display method and an image display program product, and particularly to an image display apparatus, an image display method and an image display program product displaying an image while retaining confidentiality thereof.

2. Description of the Related Art

In an image processing apparatus such as an MFP (Multi Function Peripheral), a printer, a copying machine, and the like, an image display apparatus such as a display panel has been made larger as the function is more sophisticated or an operation is more complicated. At the same time, considering operability, the image display apparatus has increasingly been arranged at a position readily viewed from the front of the apparatus, for example, in a document holding portion provided above the apparatus or on the front face of the apparatus.

A user can thus readily check display for operation on the image display apparatus, and the operability of the image processing apparatus is improved. In addition, a technology for upsizing an LCD (Liquid Crystal Display) mostly used in the image display apparatus has improved and visibility thereof has also been enhanced. Therefore, operability is further enhanced by mounting a large-size image display apparatus on the image processing apparatus.

Such upsizing of the image display apparatus of the image processing apparatus specifically permits an operation to display image data, obtained by scanning or by reception from another apparatus, for preview prior to output so as to check the contents, orientation, or the like.

If the image data is displayed for preview on the image display apparatus that has been upsized and arranged at a readily viewable position as described above, however, the preview display may be seen by an unintended third party, for example, from behind the user. In addition, if the user leaves the image processing apparatus as well, the preview display may be seen by an unintended third party.

As a technology to prevent leakage of display contents on the image display apparatus, for example, Japanese Laid-Open Patent Publication No. 11-052942 (hereinafter, referred to as Patent Document 1) discloses a technology of such bus control as suppressing reading of a non-display region designated in advance at the time when display data is read from a memory. In addition, Japanese Laid-Open Patent Publication No. 06-290251 (hereinafter, referred to as Patent Document 2) discloses a technology to analyze image data, detect character string that should be kept secret, and mask such portion. Moreover, Japanese Laid-Open Patent Publication No. 02-048857 (hereinafter, referred to as Patent Document 3) discloses a technology to designate a region to be masked in image data and to convert that region to a prescribed color.

If the technology disclosed in Patent Document 1 or the technology disclosed in Patent Document 2 described above is applied to the image display apparatus of the image processing apparatus, however, the processing in the image display apparatus becomes complicated. Consequently, a processing time longer than in the case where such processing is not performed is necessary, or a high-performance apparatus is necessary, which leads to higher cost.

Alternatively, if the technology disclosed in Patent Document 3 described above is applied to the image display apparatus of the image processing apparatus, an operation to designate the region to be masked is necessary, which leads to poorer operability.

Moreover, in the case of a fixed-format image, analyzing the image or performing an operation to set a non-display region each time results in increased complexity in the apparatus and the operation.

Further, an amount of data of an original image is increased due to masking or the like.

As described above, when the image display apparatus of the image processing apparatus is upsized and preview display of image data on the same is attempted, it is difficult to retain security with an easy and simplified configuration.

SUMMARY OF THE INVENTION

From the foregoing, the present invention was made to solve the above-described problems. An object of the present invention is to provide an image display apparatus, an image display method and an image display program product capable of checking image data while maintaining security.

In order to achieve the object above, according to one aspect of the present invention, an image display apparatus includes: a reading unit reading a document and obtaining image data; a display unit displaying the image data; a setting unit setting a format which is information designating a non-display region in displaying the image data; a modification unit modifying the image data such that the region of the image data is displayed in an invisible manner, based on the format; a control unit controlling display such that the image data modified by the modification unit is displayed on the display unit; and an addition unit adding to the image data, format location information which is information designating a storage unit storing the format.

According to another aspect of the present invention, an image display apparatus includes: a reading unit reading a document and obtaining image data; a first obtaining unit obtaining format location information from the image data, the format location information designating a storage unit which stores format being added to the image data; a second obtaining unit obtaining the format based on the format location information, the format designating a non-display region in displaying the image data being set in the image data; a display unit displaying the image data; a modification unit modifying the image data such that the region of the image data is displayed in an invisible manner, using the format; and a control unit controlling display such that the image data modified by the modification unit is displayed on the display unit.

As the image display apparatus according to the present invention is configured as above, in checking top-bottom, tilt, or the like of image data by displaying the same on the display unit, the region of which confidentiality should be retained in the image data can be displayed in an invisible manner, and the image data can be checked while retaining confidentiality of the region of which confidentiality should be retained by not allowing display of that region. In doing so, the non-display region can readily be set by designating the format.

In addition, in order to set the non-display region by specifying the format registered in advance in another apparatus, the image data is transmitted to another apparatus along with information specifying the format, so that the image data is displayed also on the apparatus on the reception side with confidentiality intended by a sender being retained. As the information specifying the format registered in another apparatus is transmitted along with the image data, an amount of transmitted data can be smaller than in the case where the format itself is transmitted.

According to yet another aspect of the present invention, an image display method directed to an image display method in an image display apparatus including a display unit includes the steps of: reading a document and obtaining image data; setting a format which is information designating a non-display region in displaying the image data; modifying the image data such that the region of the image data is displayed in an invisible manner, based on the format; controlling display such that the modified image data is displayed on the display unit; and adding to the image data, format location information which is information designating a storage unit storing the format.

According to yet another aspect of the present invention, an image display method directed to an image display method in an image display apparatus including a display unit includes the steps of reading a document and obtaining image data; obtaining format location information from the image data, the format location information designating a storage unit which stores format being added to the image data; obtaining the format based on the format location information, the format designating a non-display region in displaying the image data being set in the image data; modifying the image data such that the region of the image data is displayed in an invisible manner, using the format; and controlling display such that the modified image data is displayed on the display unit.

According to yet another aspect of the present invention, an image display program product causing a computer to carry out control of display of image data in an image display apparatus including a display unit, causes the computer to execute the steps of: reading a document and obtaining image data; setting a format which is information designating a non-display region in displaying the image data; modifying the image data such that the region of the image data is displayed in an invisible manner, based on the format; controlling display such that the modified image data is displayed on the display unit; and adding to the image data, format location information which is information designating a storage unit storing the set format.

According to yet another aspect of the present invention, an image display program product causing a computer to carry out control of display of image data in an image display apparatus including a display unit, causes the computer to execute the steps of: reading a document and obtaining image data; obtaining format location information from the image data, the format location information designating a storage unit which stores format being added to the image data; obtaining the format based on the format location information, the format designating a non-display region in displaying the image data being set in the image data; modifying the image data such that the region of the image data is displayed in an invisible manner, using the format; and controlling display such that the modified image data is displayed on the display unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 illustrates a specific example of the image data and an extraction example of the image region.

FIG. 9 illustrates an extraction example of the image region.

FIGS. 10 to 12 illustrate extraction examples of the image region.

FIG. 14 illustrates a method of designating a non-display region with a curve.

FIG. 17 illustrates a plurality of areas included in the non-display region and/or the display region designated in a format.

FIG. 19 illustrates a specific example in which format location information is added as a three-dimensional barcode.

FIGS. 23 to 25 illustrate display examples of image data.

DESCRIPTION OF THE PREFERRED EMBODIMENTS

Figure 1:
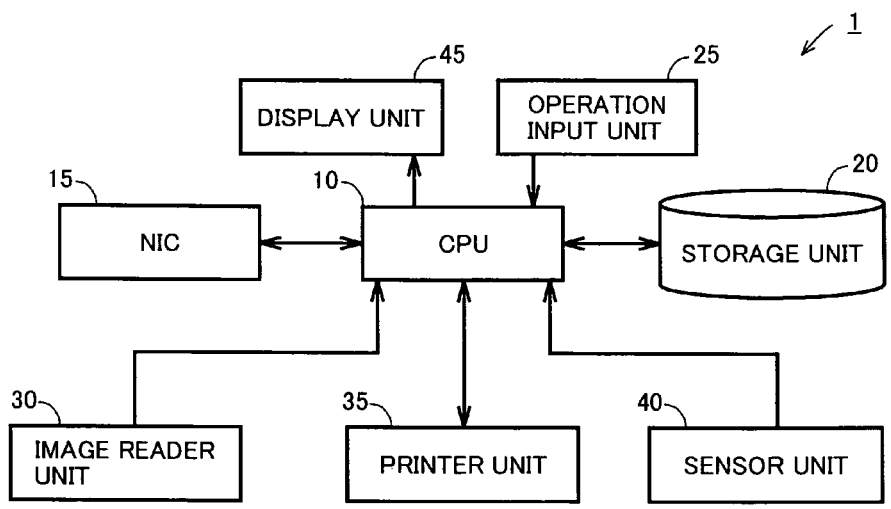
FIG. 1 is a block diagram showing a specific example of a hardware configuration of a printing apparatus 1.

An embodiment of the present invention will be described hereinafter with reference to the drawings. In the description below, the same elements and components have the same reference characters allotted. Their label and function are also identical.

A display apparatus mounted on or connected to an image processing apparatus, such as a printer, a copying machine or an MFP (Multi Function Peripheral) which is combination thereof, is applicable as an image display apparatus according to the present invention. A printing apparatus 1 which is the MFP is assumed as the image display apparatus in the present embodiment, and FIG. 1 shows in a block diagram, a specific example of a hardware configuration of printing apparatus 1 which is the MFP.

Referring to FIG. 1, printing apparatus 1 includes a CPU (Central Processing Unit) 10 controlling overall apparatus, an image reader unit 30 reading image data from a document, a printer unit 35 printing an image on a sheet of paper, an NIC (Network Interface Card) 15 representing an expansion card inserted in a not-shown expansion slot so as to connect printing apparatus 1 to a network or a telephone line and establish short-range radio communication, a storage unit 20 constituted of an HD (Hard Disk), an RAM (Random Access Memory) and the like, for storing a job, a program executed by CPU 10, and the like, an operation input unit 25 implemented by an operation button and the like accepting operation and input from a user, a sensor unit 40 detecting a remaining quantity or the like of printing paper or toner, and a display unit 45 implemented by a panel or the like displaying a preview image, operational information and the like to the user. It is noted that operation input unit 25 and display unit 45 may be implemented as one apparatus such as a touch screen.

Figure 2:
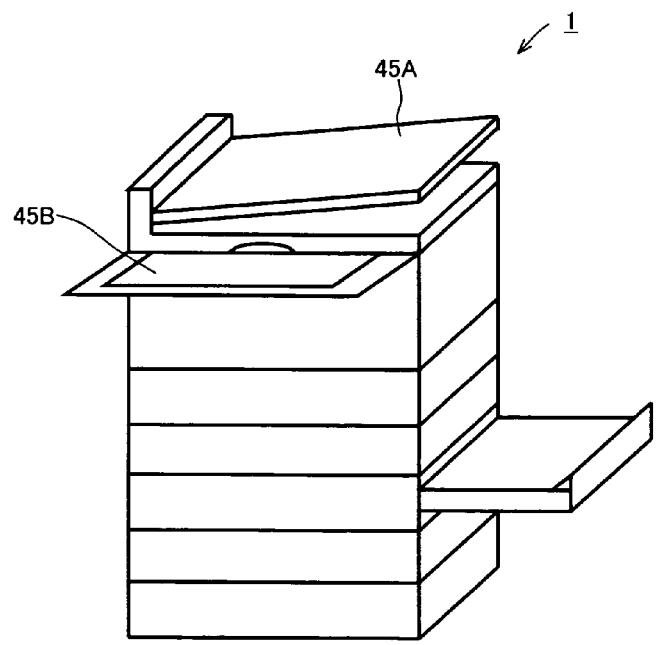
FIG. 2 illustrates a specific example of appearance of printing apparatus 1.

As shown in FIG. 2, in the present embodiment, display unit 45 includes a display region implemented, for example, by a large-size LCD (Liquid Crystal Display), and it is arranged in a portion corresponding to a document holder above the upper surface of printing apparatus 1 (display unit 45A), in a front portion of printing apparatus 1 (display unit 45B), and the like. It is noted that display unit 45A, 45B is shown in FIG. 2 by way of illustration of an arrangement position of display unit 45, and the display unit may be arranged in another position without limited to those shown in FIG. 2, so long as the user readily views the display.

[First Embodiment]

Figure 3:
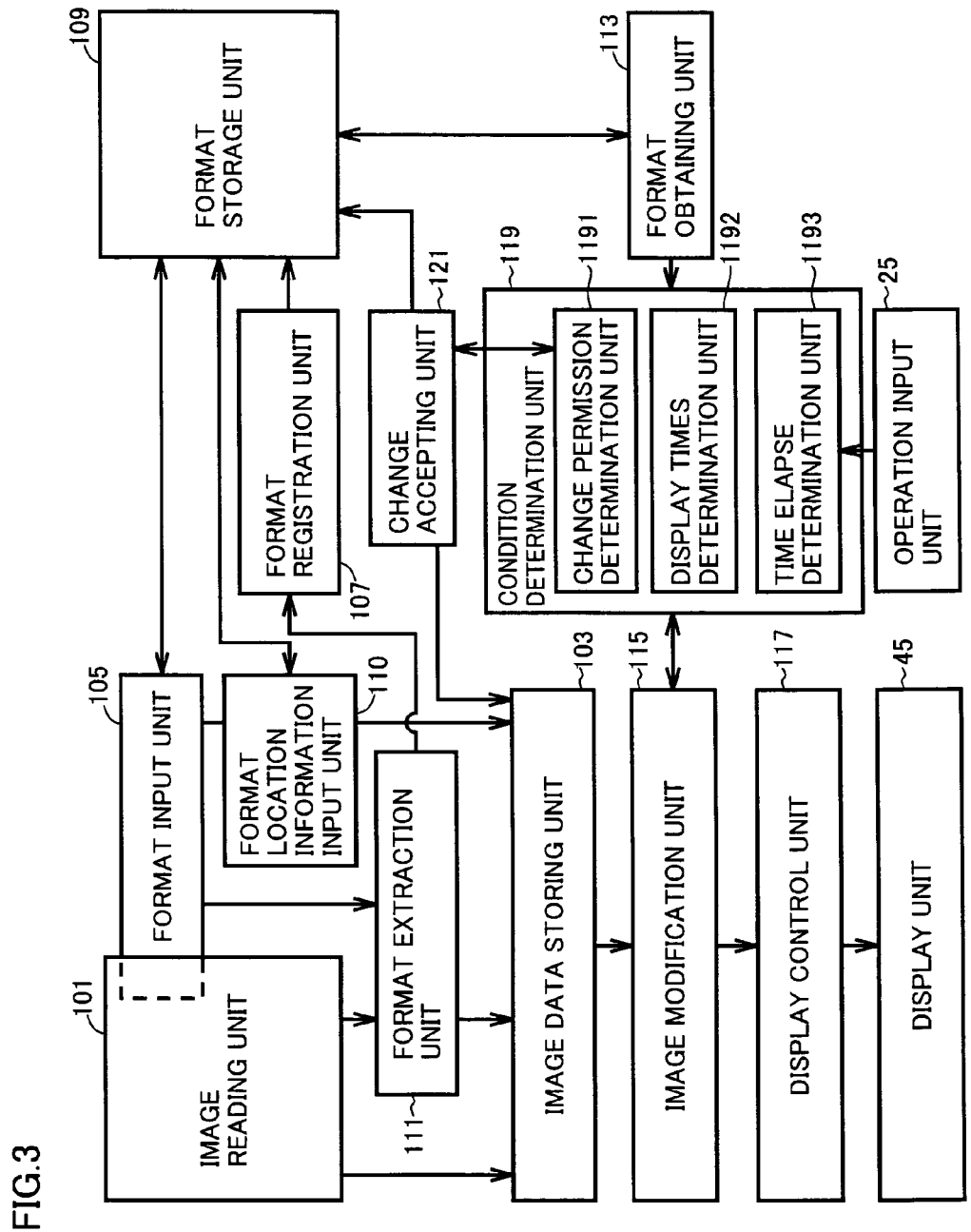
FIG. 3 is a block diagram showing a specific example of a functional configuration for controlling display of image data on a display unit in printing apparatus 1 according to a first embodiment.

Each function for controlling display of the image data on display unit 45 shown in FIG. 3 is configured mainly in CPU 10, as a result of reading and execution of the program stored in storage unit 20 by CPU 10 of printing apparatus 1. It is noted that at least a part of the functions shown in FIG. 3 may be attained by the hardware configuration of printing apparatus 1.

Referring to FIG. 3, the functions of printing apparatus 1 according to the first embodiment are configured to include an image reading unit 101, an image data storing unit 103, a format input unit 105, a format registration unit 107, a format storage unit 109, a format location information input unit 110, a format extraction unit 111, a format obtaining unit 113, an image modification unit 115, a display control unit 117, a condition determination unit 119, and a change accepting unit 121.

Image reading unit 101 accepts the image data obtained through scanning by image reader unit 30 or the image data received from another apparatus through NIC 15, and inputs the image data into image data storing unit 103. In addition, image reading unit 101 passes the image data to format extraction unit 111 as necessary. Image data storing unit 103 serves as an area for storing the image data constituted of a prescribed area and the like of storage unit 20, and stores the input image data.

Format input unit 105 refers to format storage unit 109 described later and selects and inputs a format set for the image data, for example, based on an operation signal from operation input unit 25. The set format is input to image data storing unit 103. Alternatively, the format may be designated by the image as will be described later. In such a case, format input unit 105 may serve as a part of image reading unit 101, and may input the format set for the image data by reading the image. Alternatively, format input unit 105 may input information for creating the format, and the information is input to format extraction unit 111.

The format designates a non-display region and/or a display region out of the image data in displaying the image data at least on display unit 45 of printing apparatus 1. In addition, the format designates a type of the image data. Examples of information designating the type of the image data include information indicating correspondence between the contents of the image and the coordinate position, that is, information on what is represented in which part of an image, for example, in a "driver's license", an "insurance card", or specific documents formatted in a company. For example, if the format is the "driver's license", information on display or non-display for each pixel includes such information that a pixel corresponding to the region where a photograph and an address are shown should be displayed in an invisible manner and a pixel corresponding to other regions should be displayed, or the like.

In addition, the format includes a condition for displaying a target region in an invisible manner and/or a condition for displaying a target region, such as information restricting change in the format itself, information restricting the number of times of display of the image data with the target region being displayed in an invisible manner, and the like. These conditions correspond to a display level indicating a security level in displaying target image data.

Here, "non-display" refers to display of the designated region in the image data in an invisible manner. For "non-display", data of a corresponding portion of the original image data may be modified so that it is invisible or may be replaced with other data.

Format extraction unit 111 extracts the format from the image designating the format read by image reading unit 101. Alternatively, format extraction unit 111 extracts the format from the image data read by image reading unit 101, based on the information for creating the format that has been input from format input unit 105. The extracted format is also stored in image data storing unit 103. In addition, the format extracted by format extraction unit 111 may be passed to format registration unit 107, and stored in format storage unit 109 serving as the area for storing the information indicating the non-display region, that is constituted of a prescribed area and the like of storage unit 20.

Format location information specifying the location of the format input through format input unit 105 or the format extracted by format extraction unit 111 is read by referring to format storage unit 109, input through format location information input unit 110, and stored in image data storing unit 103 in association with target image data.

In displaying the image data on display unit 45, image modification unit 115 reads from image data storing unit 103, necessary image data and the format designated with the location specified in the format location information that has been stored in association with the image data. More specifically, the format designated with the location specified in the format location information is obtained by format obtaining unit 113, and input to image modification unit 115 through condition determination unit 119.

Condition determination unit 119 includes a change permission determination unit 1191, a display times determination unit 1192 and a time elapse determination unit 1193, and determines whether the format is to be applied to image modification or not based on the condition included in the format. Specifically, display times determination unit 1192 uses the information included in the format that indicates the non-display region, and counts the number of times so far that the image data has been displayed with the corresponding region being displayed in an invisible manner. Then, display times determination unit 1192 determines whether the corresponding region should be displayed in an invisible manner this time in accordance with the number of times of display. In addition, time elapse determination unit 1193 monitors a time interval from one operation to a next operation and determines whether the time interval attains to a predetermined time interval, based on an operation signal from operation input unit 25.

Change accepting unit 121 changes the format based on an operation signal or the like from operation input unit 25. Here, change permission determination unit 1191 determines whether change in the format is permitted or not based on the condition included in the format, and restricts change in change accepting unit 121. The changed format is stored in image data storing unit 103 or format storage unit 109 as necessary.

Image modification unit 115 subjects the read image data to image modification such that the designated region is displayed in an invisible manner and/or displayed, using the corresponding format and in accordance with determination in condition determination unit 119. The modified image data is input to display control unit 117, where control for displaying the image data on display unit 45 is carried out.

Figure 4:
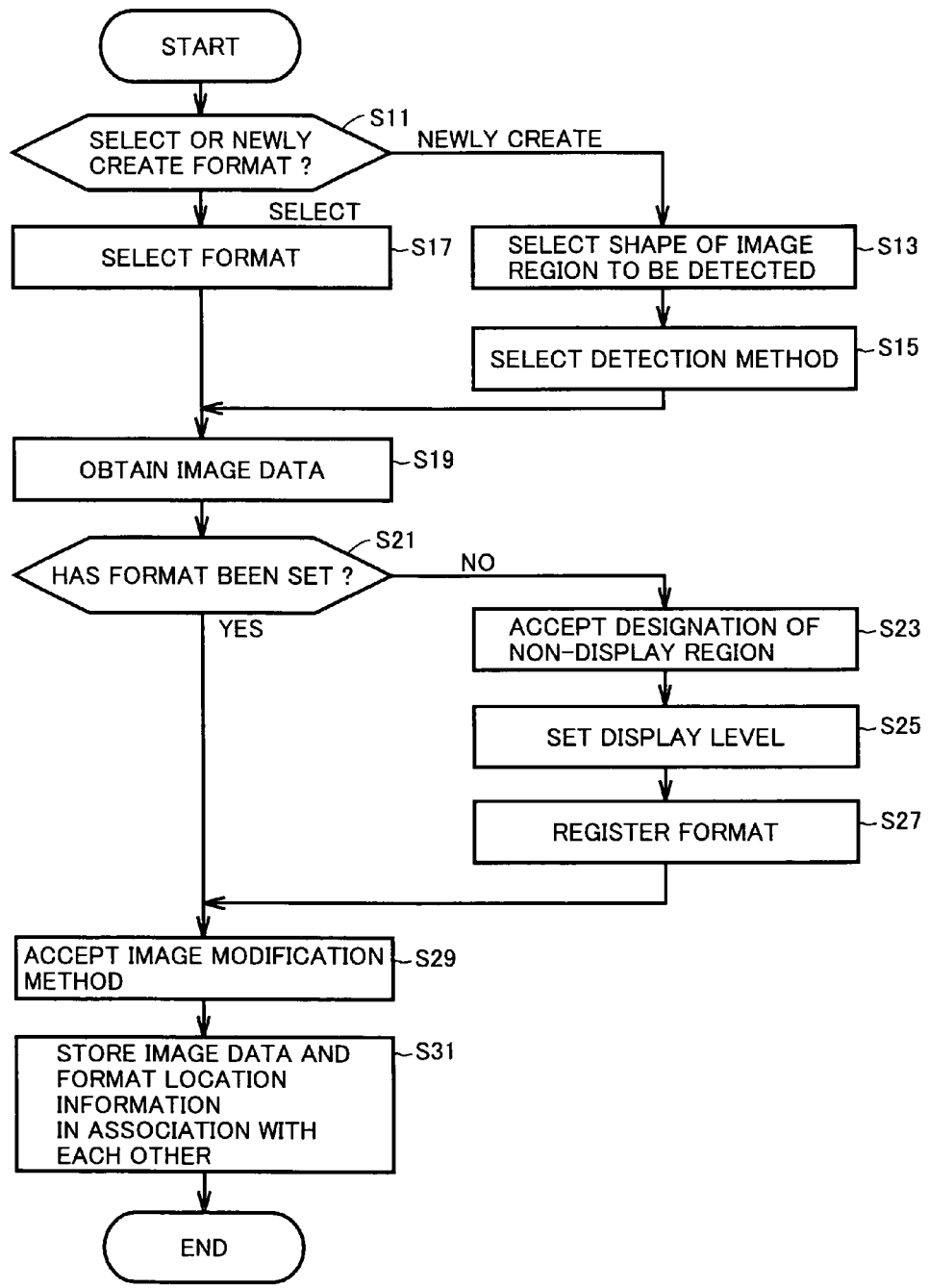
FIG. 4 is a flowchart illustrating processing for scanning and reading a document and setting a non-display region and/or a display region for image data in printing apparatus 1 according to the first embodiment.

The processing shown in the flowchart in FIG. 4 is performed as a result of reading and execution of the program stored in storage unit 20 by CPU 10 of printing apparatus 1 and functioning of each unit shown in FIG. 3.

Figure 5:
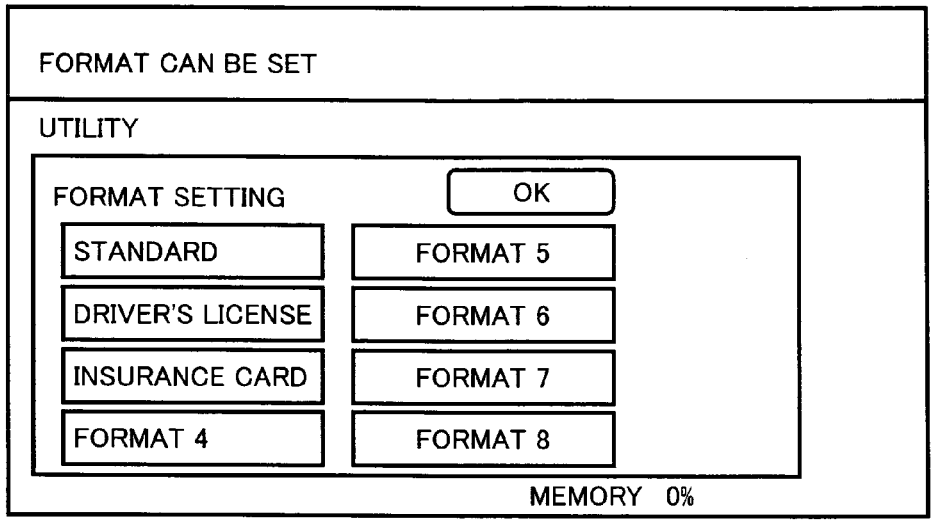
FIG. 5 illustrates a specific example of a menu screen.

Referring to FIG. 4, initially, before image reader unit 30 reads the document, format input unit 105 displays a menu screen shown in FIG. 5 on display unit 45. When an input to set the format for the image data obtained by reading of the document is made, format input unit 105 accepts selection as to whether the format should be selected from among formats already registered in format storage unit 109 and then input or the format should be newly created and then input (step S11). The screen in FIG. 5 shows a menu of choices representing the formats stored in format storage unit 109 ("standard", "driver's license", and "insurance card") and a menu of choices simply with format denotation, that is, corresponding to no format, ("format 4" and the like).

If the format is selected from among the already registered formats and the selected format is input in the screen in FIG. 5 ("select" in step S11), the choice representing the format stored in format storage unit 109 is selected, whereby that format is input as the format to be used (step S17).

If the choice simply with format denotation, that is, corresponding to no format, is selected in the screen in FIG. 5, the format is newly created ("newly create" in step S11). Here, format input unit 105 displays on display unit 45, a screen for setting a shape to be detected in detection of the image region designated as the non-display region and/or the display region in the newly created format shown in FIG. 6, and accepts selection of the shape (step S13). In addition, format input unit 105 displays the screen for setting a method of detecting the image region shown in FIG. 7, and accepts selection of the method of detecting the region (step S15). In the screen in FIG. 7, whether to erase an element, such as a ruled line affecting accuracy in detection of the image region, the image designating the format such as a three-dimensional bar-code or the like which will be described later, a header, a footer, and a page number, can be designated. Whether to enhance accuracy in detecting the image region in accordance with the contents of the image data can thus be selected. In the screen in FIG. 6, it is assumed that a plurality of elements can be set as elements to be erased.

Thereafter, the set document is scanned by image reader unit 30, and the image data is obtained by image reading unit 101 (step S19).

If the format is not selected in steps S11, S17 (NO in step S21), format extraction unit 111 extracts the non-display region and/or the display region designated with the newly created format from the image data obtained in step S19, in accordance with the setting made in steps S13, S15 (step S23).

Figure 6:
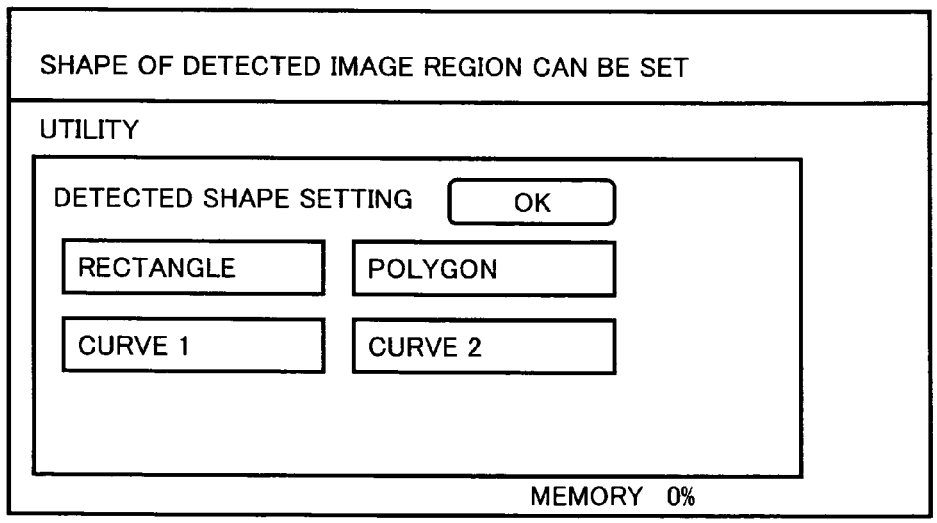
FIG. 6 illustrates a specific example of a screen for setting a shape of an image region detected from the image data.
Figure 7:
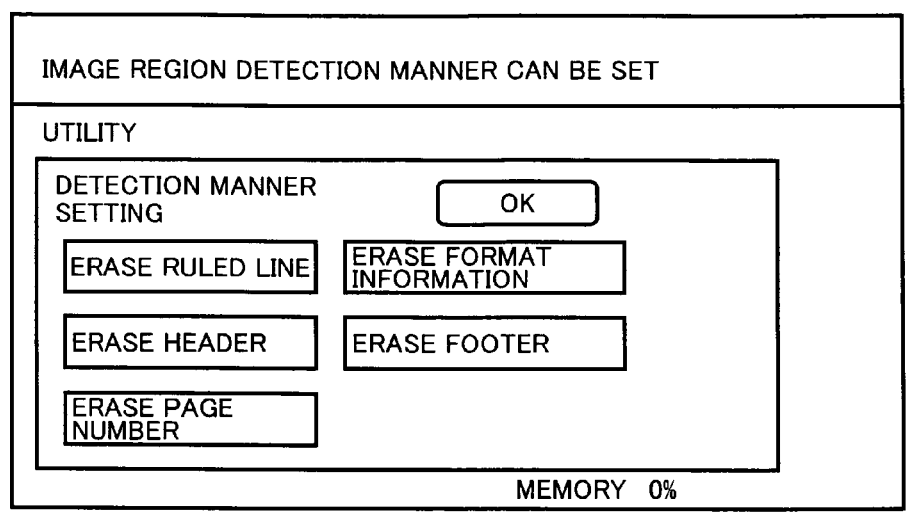
FIG. 7 illustrates a specific example of a screen for setting a method of detecting the image region.

If the shape "rectangle" is selected in the screen in FIG. 6 in step S13 for detection of the image region and that image region is set as the non-display region, it is assumed that the image data obtained in step S19 is the image data shown in FIG. 8. Then, in step S23, format extraction unit 111 analyzes the read image data. With regard to the inside of a peripheral edge 200 of the image data, format extraction unit 111 assumes a region having uniform density lower than a prescribed value as the background, and detects a region having higher density than the background, thus extracting a largest rectangular region enclosing that high-density region as an image region 210. In addition, format extraction unit 111 extracts the region located inside a peripheral edge of image region 210 by a prescribed distance therefrom as a non-display region 220. FIG. 8 shows that the region located inside the vertical and horizontal peripheral edges of image region 210 by a distance Lx in the horizontal direction and a distance Ly in the vertical direction respectively is extracted as non-display region 220.

Other specific examples of the method of detecting the image region in step S23 include the following. It is assumed that the shape of the image region to be detected is set as "curve" in the screen in FIG. 6, the detection method is set as "erase format information" and "erase ruled line" in the screen in FIG. 7, and the image data obtained in step S19 further includes the image representing the format which will be described later (three-dimensional bar-code here). Then, as shown in FIG. 9, the region enclosing solely the character region is detected as image region 210, and the region located inside the peripheral edges of image region 210 by a prescribed distance therefrom is extracted as non-display region 220. In addition, an image region 230 representing the format is also extracted.

In addition, another specific example is as follows. It is assumed that the shape of the image region to be detected is set as "curve" in the screen in FIG. 6, no detection method is set, and the image data obtained in step S19 similarly further includes the image representing the format which will be described later. Then, as shown in FIG. 10, the region enclosing not only the character region but also the ruled line and the image representing the format with the curve is detected as image region 210, and the region located inside the peripheral edges of image region 210 by a prescribed distance therefrom is extracted as non-display region 220.

Moreover, another specific example is as follows. It is assumed that the shape of the image region to be detected is set as "polygon" in the screen in FIG. 6, the detection method is set as "erase format information" and "erase ruled line" in the screen in FIG. 7, and the image data obtained in step S19 similarly further includes the image representing the format which will be described later. Then, as shown in FIG. 11, the region enclosing solely the character region with the polygon is detected as image region 210, and the region located inside the peripheral edges of image region 210 by a prescribed distance therefrom is extracted as non-display region 220. In addition, image region 230 representing the format is also extracted.

In addition, another specific example is as follows. It is assumed that the shape of the image region to be detected is set as "polygon" in the screen in FIG. 6, no detection method is set, and the image data obtained in step S19 similarly further includes the image representing the format which will be described later. Then, as shown in FIG. 12, the region enclosing not only the character region but also the ruled line and the image representing the format with the polygon is detected as image region 210, and the region located inside the peripheral edges of image region 210 by a prescribed distance therefrom is extracted as non-display region 220.

As in the specific examples above, the region located inside the peripheral edges of image region 210 by a prescribed distance therefrom, that is, the region inside the boundary of the image region, is set as the non-display region, so that the boundary of image region 210 is displayed when this format is applied for display of the image data. Therefore, by viewing that display, a tilted state of the document can be checked.

In step S23, format input unit 105 may display the image data read as shown in FIG. 8 on display unit 45, accept touching of the touch screen and an input of numeric keys, and accept an instruction designating an arbitrary region as the non-display region, and format extraction unit 111 may extract the non-display region and/or the display region designated with the newly created format, in accordance with the input of the instruction. Alternatively, in step S23, the image region extracted as the non-display region and/or the display region designated with the newly created format as described above may be changed in accordance with the input of the instruction.

Figure 13:
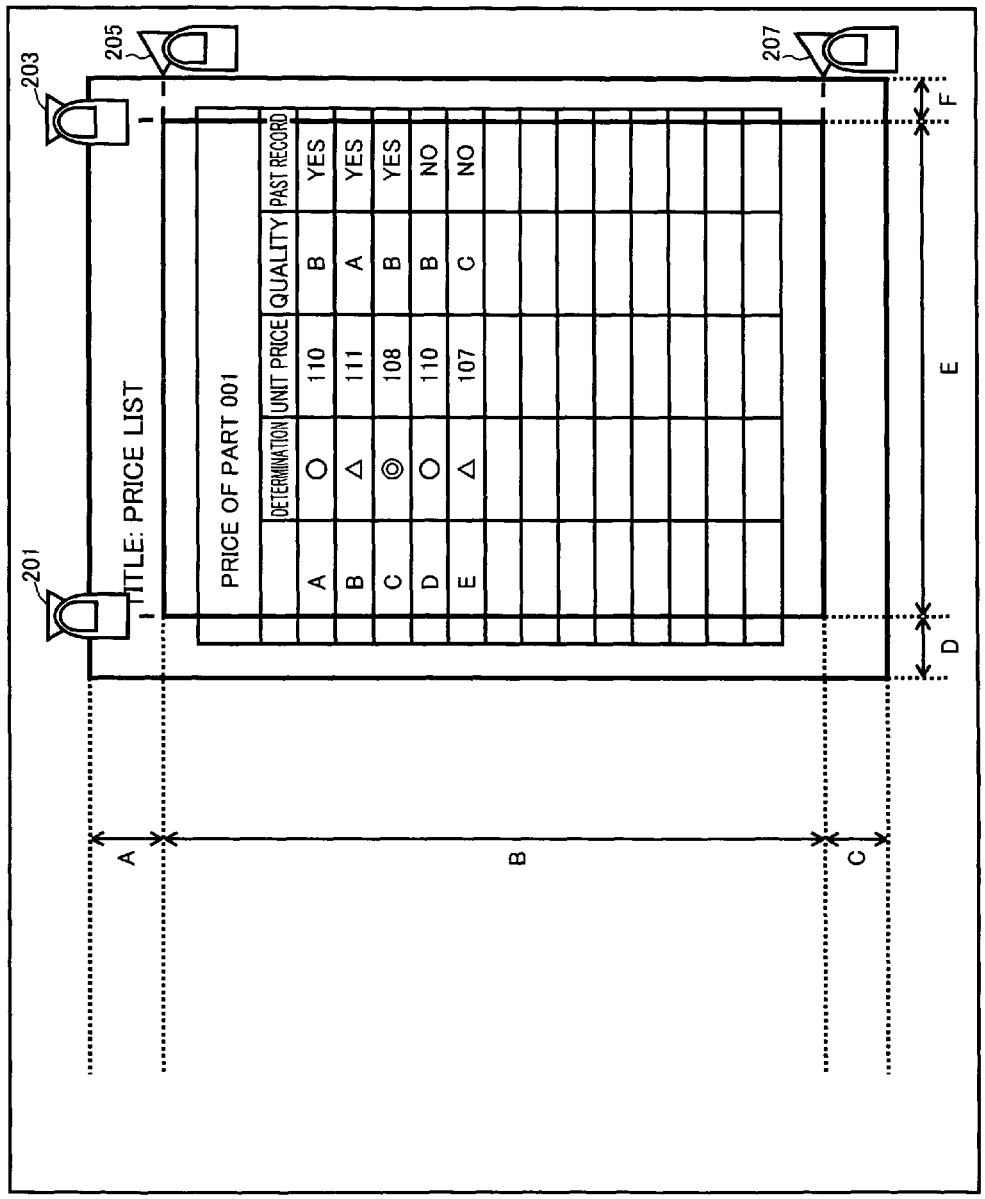
FIG. 13 illustrates a method of designating a non-display region with a rectangle.

A method of designating a desired region on the displayed image data as the format-designated non-display and/or display region includes, for example, a method of designating the region with a rectangle, a curve and a polygon. In the method of designating the non-display region with a rectangle, referring to FIG. 13, if display unit 45 is implemented by the touch screen, marks 201, 203, 205, and 207 representing opposing ends of each side of the rectangle enclosing the non-display region are displayed on display unit 45, and the position of each side of the rectangle can be designated by touching the mark with a finger or the like and sliding the finger or the like while the mark is kept touched. Though the position of each side can be designated by moving each mark in FIG. 13, the rectangle may be designated by designating two diagonally opposite points, so as to designate the non-display region.

In the method of designating the non-display region with a curve, referring to FIG. 14, if display unit 45 is implemented by the touch screen, as a result of sliding of a finger or the like over display unit 45, format input unit 105 subjects coordinates obtained by sampling a trace thereof at prescribed intervals to curve-fitting, so that the non-display region designated with the newly created format can be input. Alternatively, format input unit 105 may accept designation of arbitrary points from the user, connect the points with a curve in the order of designation through format input unit 105, and input the non-display region designated with the newly created format. One non-display region may be enclosed by one curve or by a plurality of curves. This is also the case with the method of designating the non-display region with a polygon.

Figure 15:
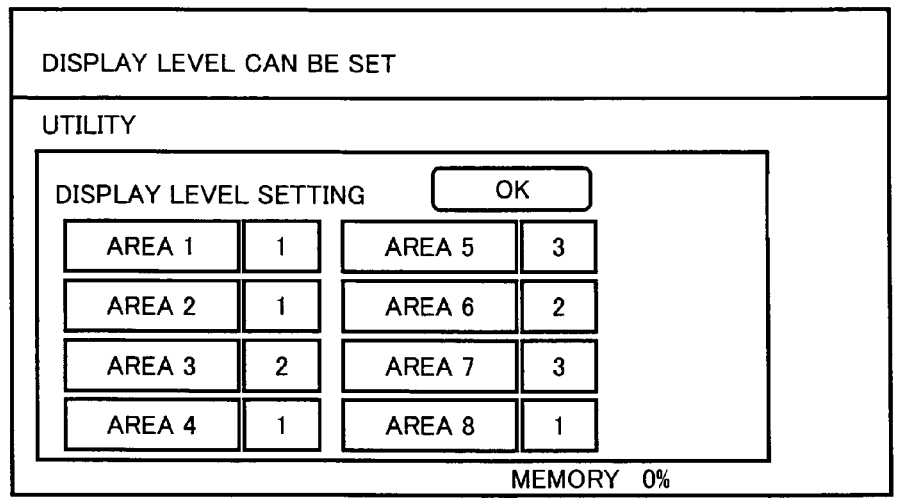
FIG. 15 illustrates a specific example of a screen for setting a display level.

In addition, in order to set the display level described above as the condition for non-display and/or display for the non-display region and/or the display region designated with the new format, format input unit 105 causes display of the screen shown in FIG. 15 on display unit 45 and accepts setting of the display level (step S25). If a plurality of areas are designated as the non-display region in one format, the display level serving as the condition above can be set for each area.

Here, it is assumed that levels 1 to 3 are set as specific display levels. As shown in FIG. 15, any one of levels 1 to 3 is allocated to each of a plurality of areas 1 to 8. Format input unit 105 can accept the condition for non-display and/or display of the corresponding region for each level by displaying the screen shown in FIG. 16. Specifically, the condition for display includes the number of times of display of the image data with the target region being displayed in an invisible manner, and the condition for non-display and/or display of the target region includes duration of a state in which operation input unit 25 is not operated (referred to as a non-operation period). In addition, whether change of the format itself is permitted or not is included as the condition. Moreover, as another condition, authentication necessary for displaying again the region that has once been set as the non-display region may differ for each display level, such as detection of contact, password authentication, physical unlocking, biometrics, and the like.

Figure 16:
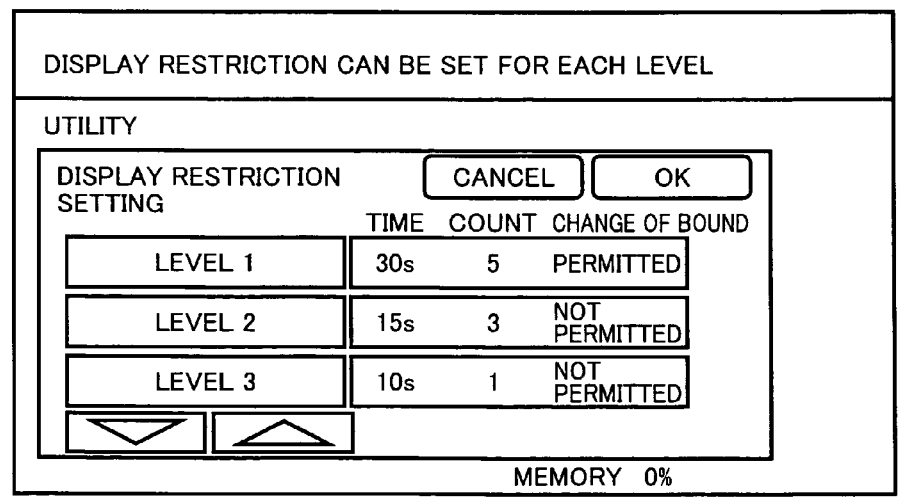
FIG. 16 illustrates a specific example of a screen for setting a condition for display in an invisible manner and/or display of a corresponding region for each display level.

In the screen in FIG. 16, in level 1, the non-operation period until the target region is displayed in an invisible manner is set to 30 seconds, the number of times that the region is displayed in the non-display state is set to 5, and change of the format is permitted. In level 2, the non-operation period until the target region is displayed in an invisible manner is set to 15 seconds, the number of times that the region is displayed in the non-display state is set to 3, and change of the format is not permitted. In level 3, the non-operation period until the target region is displayed in an invisible manner is set to 10 seconds, the number of times that the region is displayed in the non-display state is set to 1, and change of the format is not permitted. In this manner, the display level is raised and confidentiality of the target region can be improved in the order of level 1, level 2 and level 3.

One specific method of setting the display level for each area includes a method including the steps of setting the display level for each area, for example, in the screens of FIGS. 15 and 16, touching area 1 in FIG. 15 with a finger or the like, and designating a desired region as area 1 with a finger or the like on the image data displayed as in FIG. 8. By repeating this method similarly for each area, if the region designated as the non-display and/or display region in the format includes a plurality of areas as shown in FIG. 17, the display level can be set for each area. In FIG. 17, it is assumed that a region 301, a region 303, a region 311, a region 305, regions 307, 313, and a region 309 are set as area 1, area 2, area 3, area 4, area 5, and area 6, respectively.

In the processing in steps S13, S15, S23, S25 above, the new format is created and stored as necessary in format storage unit 109 by format registration unit 107.

Figure 18:
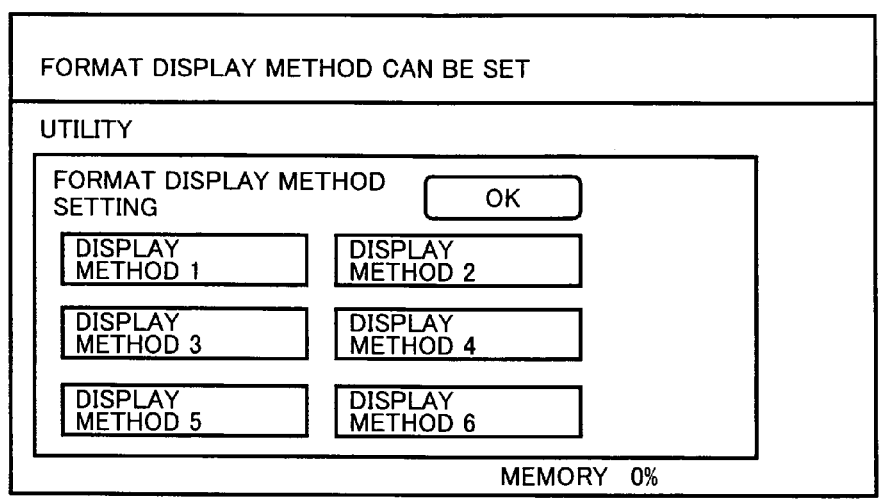
FIG. 18 illustrates a specific example of a screen for setting a method of representing a region designated as non-display in the format.

In succession, format input unit 105 displays the screen for setting the method of representing the region designated as the non-display region in the format shown in FIG. 18, and accepts the method of modifying the image (step S29). Specifically, in the screen in FIG. 18, display method 1 may be a method of displaying pixels in the corresponding region by replacing these pixels with pixels of a prescribed color and uniform density (display of what is called a solidly shaded image); display method 2 may be a method of display by lowering resolution of the corresponding region of the image data, that is, what is called mosaic processing; display method 3 may be a method of display by replacing the corresponding region with different image data (image composition); and display method 4 may be a method of display by extracting the character region from the corresponding region and deleting solely the character region. In addition, any other method may be adopted.

The format location information set for the obtained image data is stored in image data storing unit 103 in association with the image data (step S31). Here, address information of format storage unit 109 may be used as the format location information.

A first specific method of associating the image data and the format location information with each other includes a method of adding the format location information to the image data as a pattern image, as shown in FIG. 19. FIG. 19 shows an example in which the format location information is added as the three-dimensional bar-code. Other than the three-dimensional bar-code, a two-dimensional bar-code, a predefined character string, a mark, or the like may be added. Additionally, as a second specific method of associating the image data and the format location information with each other, a method of adding the format location information to any layer forming the image data may also be adopted. Moreover, as a third method, a method of embedding the format location information in the image data, using a general scheme for embedding information, may also be adopted. In addition, any other method may be adopted.

Figure 20:
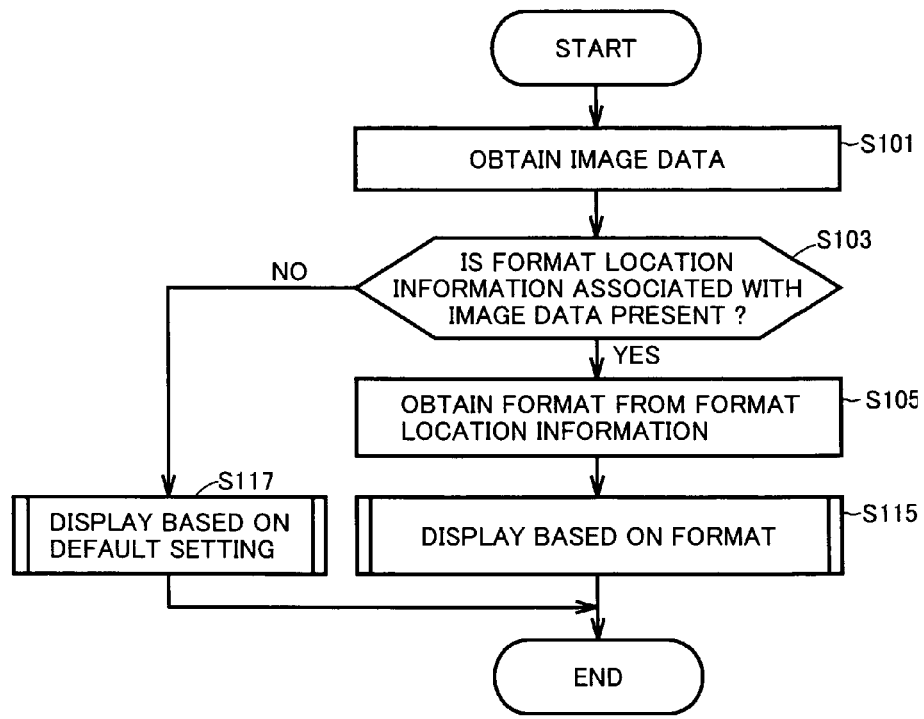
FIG. 20 is a flowchart illustrating the processing for displaying the image data on printing apparatus 1.

The processing for displaying the image data on display unit 45 in printing apparatus 1 according to the present embodiment, that is shown in the flowchart in FIG. 20, is also performed as a result of reading and execution of the program stored in storage unit 20 by CPU 10 of printing apparatus 1 and functioning of each unit shown in FIG. 3. In the processing below, it is assumed that the format designates the non-display region by way of illustration of a specific example. Even if the region to be displayed is designated, however, the image data may be displayed by performing similar processing or by performing processing to the contrary.

Referring to FIG. 20, initially, image modification unit 115 obtains the image data to be displayed on display unit 45 from image data storing unit 103 in accordance with an operation signal from operation input unit 25 (step S101). If there is format location information associated with the obtained image data (YES in step S103), image modification unit 115 obtains the format based on the location information (step S105). The image data is modified based on the format and displayed on display unit 45 (step S115). Alternatively, if it is determined that the format location information is not associated with the image data in image modification unit 115 (NO in step S103), image modification unit 115 subjects the image data to image modification under the default setting, and the image data modified under the default setting is displayed on display unit 45 (step S117).

Figure 21:
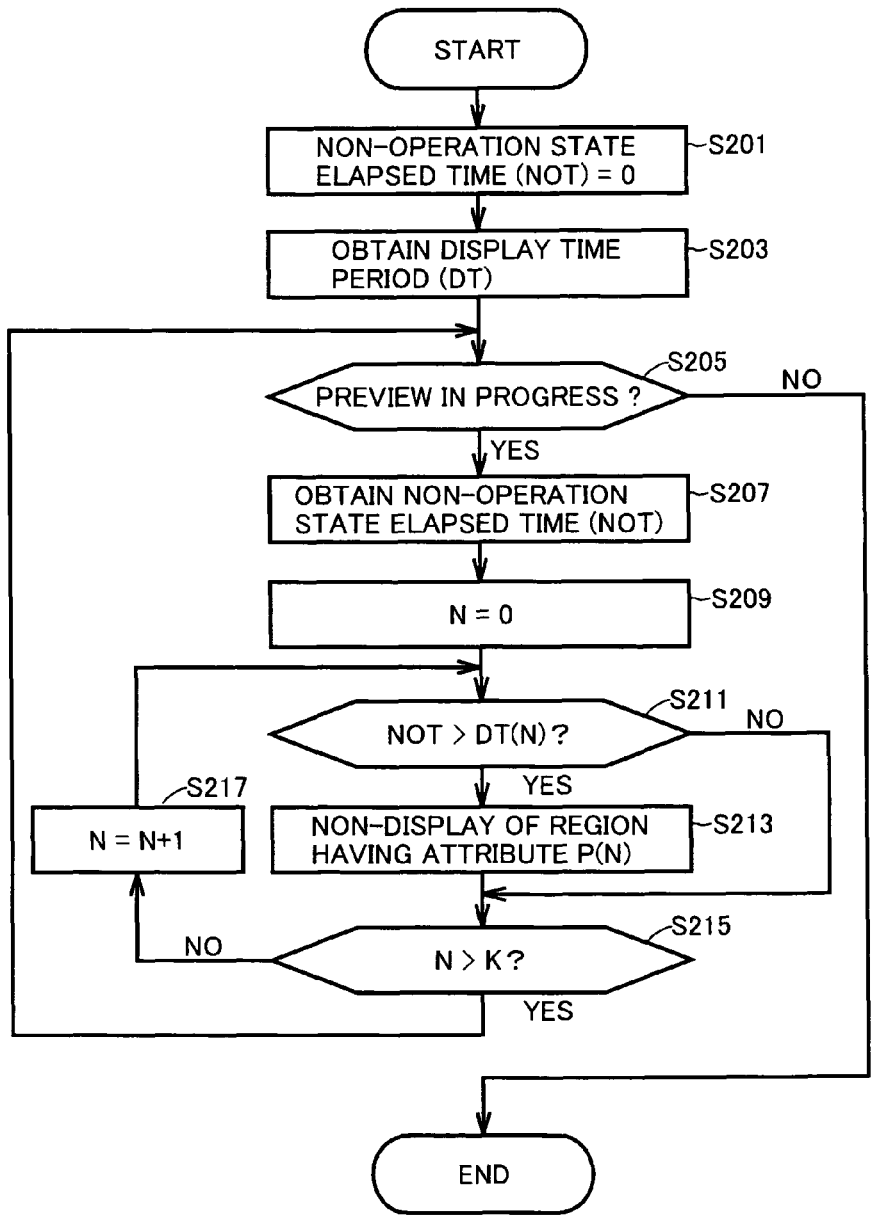
FIG. 21 is a flowchart illustrating display processing executed in step S115.

The flowchart in FIG. 21 shows the display processing performed in step S115. Referring to FIG. 21, initially, time elapse determination unit 1193 initializes a counter NOT for counting the non-operation period described above in operation input unit 25 (step S201), and obtains the non-operation period until non-display set in accordance with the display level from the format associated with the image data, for each area designated as the non-display region in the format (step S203).

If the target image data is being displayed on display unit 45 (YES in step S205), time elapse determination unit 1193 obtains current non-operation period from counter NOT (step S207), and compares current non-operation period NOT with a non-operation period DT(N) until non-display set for a display level N, sequentially from a lowest level (N=0) to a highest level (N=K−1) (steps S209, S211, S215, S217). Then, if there is a display level of which current non-operation period NOT attains to non-operation period DT(N) until non-display (YES in step S211), time elapse determination unit 1193 inputs the determination result to image modification unit 115 such that the area for which that display level has been set is displayed in an invisible manner, and the image is modified in image modification unit 115 such that the area is displayed in an invisible manner (step S213).

When comparison for each level ends (YES in step S215), the process returns again to step S205, and the processing above is again repeated while the image data is being displayed. When display of the image data ends (NO in step S205), the processing above ends.

Figure 22:
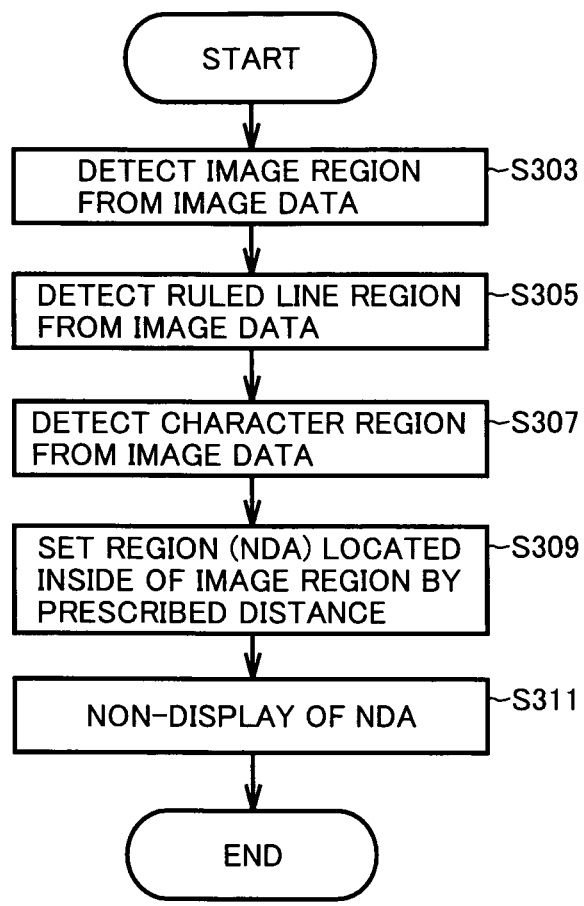
FIG. 22 is a flowchart illustrating one specific example of display processing executed in step S117.

In addition, the flowchart in FIG. 22 shows one specific example of the display processing performed in step 117. Referring to FIG. 22, if the format location information is not associated with the displayed image data, the image region is detected from the image data in format extraction unit 111 (step S303), and the ruled line region is further detected from the image data (step S305). By erasing the detected ruled line region from the image region, format extraction unit 111 detects the character region from the image data (step S307), and extracts a portion located inside the boundary of the image region by a prescribed distance therefrom as the non-display region (step S309). Then, the image is modified in image modification unit 115 such that the region extracted in step S309 is displayed in an invisible manner (step S311). If there is a large amount of ruled line region within the image region and if the image region is designated with a polygon or a curve, the character string information included in the image data may not be displayed. If the character string information is not displayed in displaying the image data, top-bottom of the image data may not be checked. Therefore, the region enclosing the character region detected in step S307 with the rectangle, the polygon or the curve may also be included in the image region.

The processing shown in the flowchart in FIG. 22 shows one specific example of the default processing. The default processing in step S117 is not limited to such processing, but another processing may be performed. Other processing includes, for example, the processing to display all image data without setting a non-display region, and the processing not to display the image data with which the non-display region has not been associated.

As the large-size display apparatus as shown in FIG. 2 is mounted on printing apparatus 1 according to the present embodiment, the image data obtained by scanning or the like can be displayed on the mounted large-size display apparatus and checked without outputting the same through a network to a personal computer or the like including the display apparatus. Namely, the user of printing apparatus 1 can check top-bottom or the like of the image data on the spot, and operability can be improved. In contrast, as a result of mounting of a large-size display apparatus, for example, if a third party is present in the vicinity of the user or if the user temporarily leaves printing apparatus 1, the displayed image data may be seen.

Such a problem, however, is solved by execution of the processing in printing apparatus 1 according to the present embodiment. Specifically, the processing in printing apparatus 1 according to the present embodiment is executed so that the region of which confidentiality should be retained in the image data can be displayed in an invisible manner, and whether the image read in the printing apparatus is the intended image or not can be checked while confidentiality of the region for which confidentiality should be retained is retained even if a third party is present in the vicinity of the user. In addition, as described above, the non-display region can be set for the image data by designating the format. Accordingly, by storing the format location information in association with the image data, the non-display region can readily be set without performing a setting operation each time of display and without performing a complicated operation for designating the coordinate or performing processing of a large processing amount such as OCR (Optical Character Reader) technique.

Figure 23:
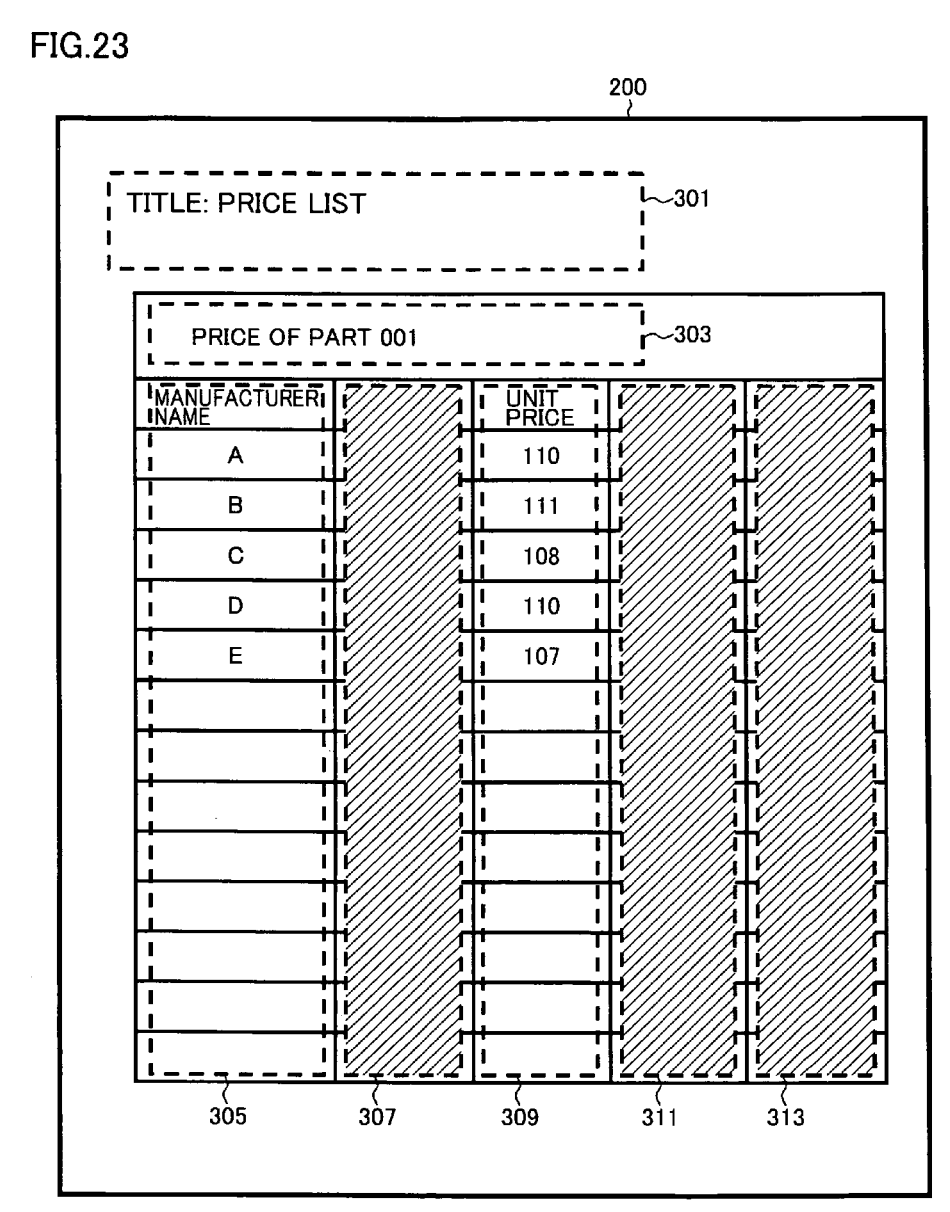
Figure 24:
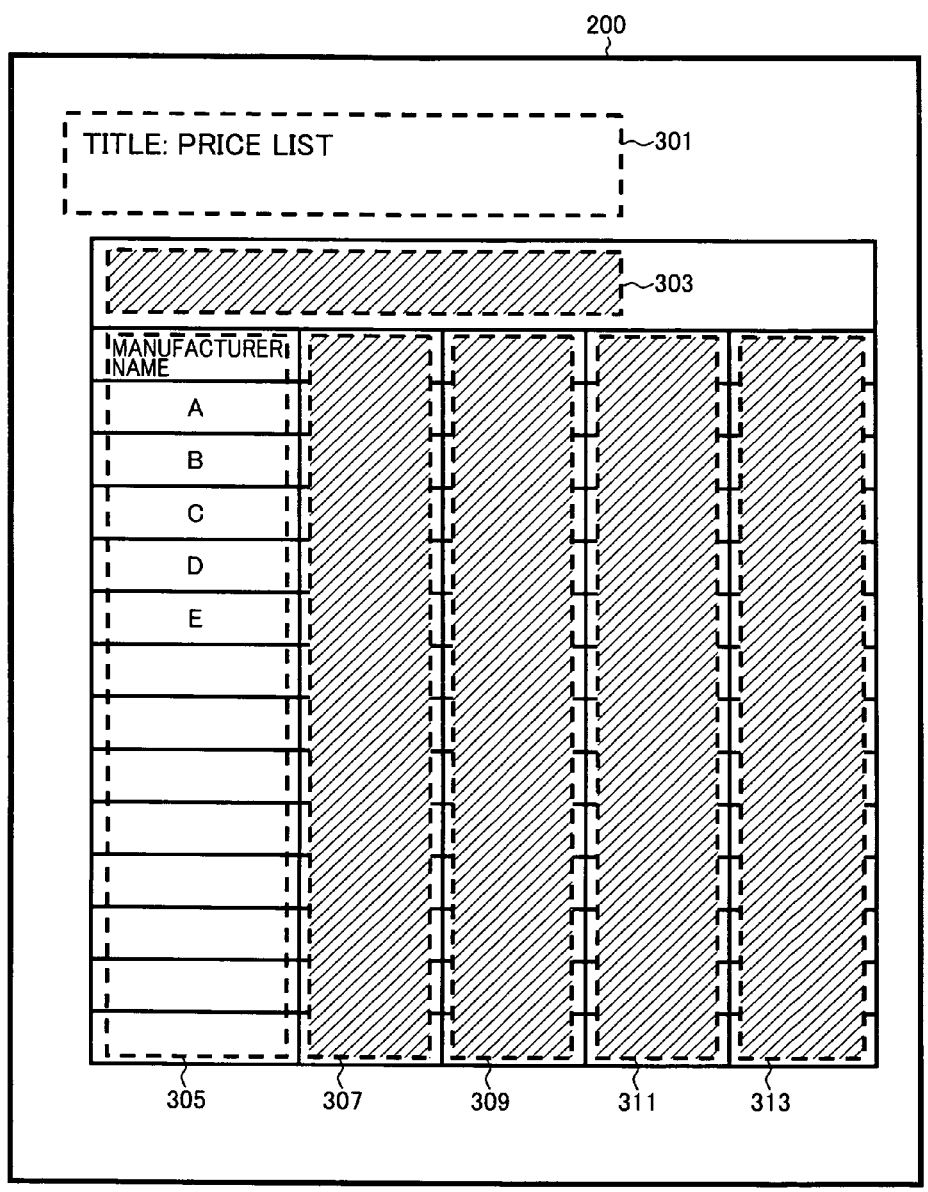
Figure 25:
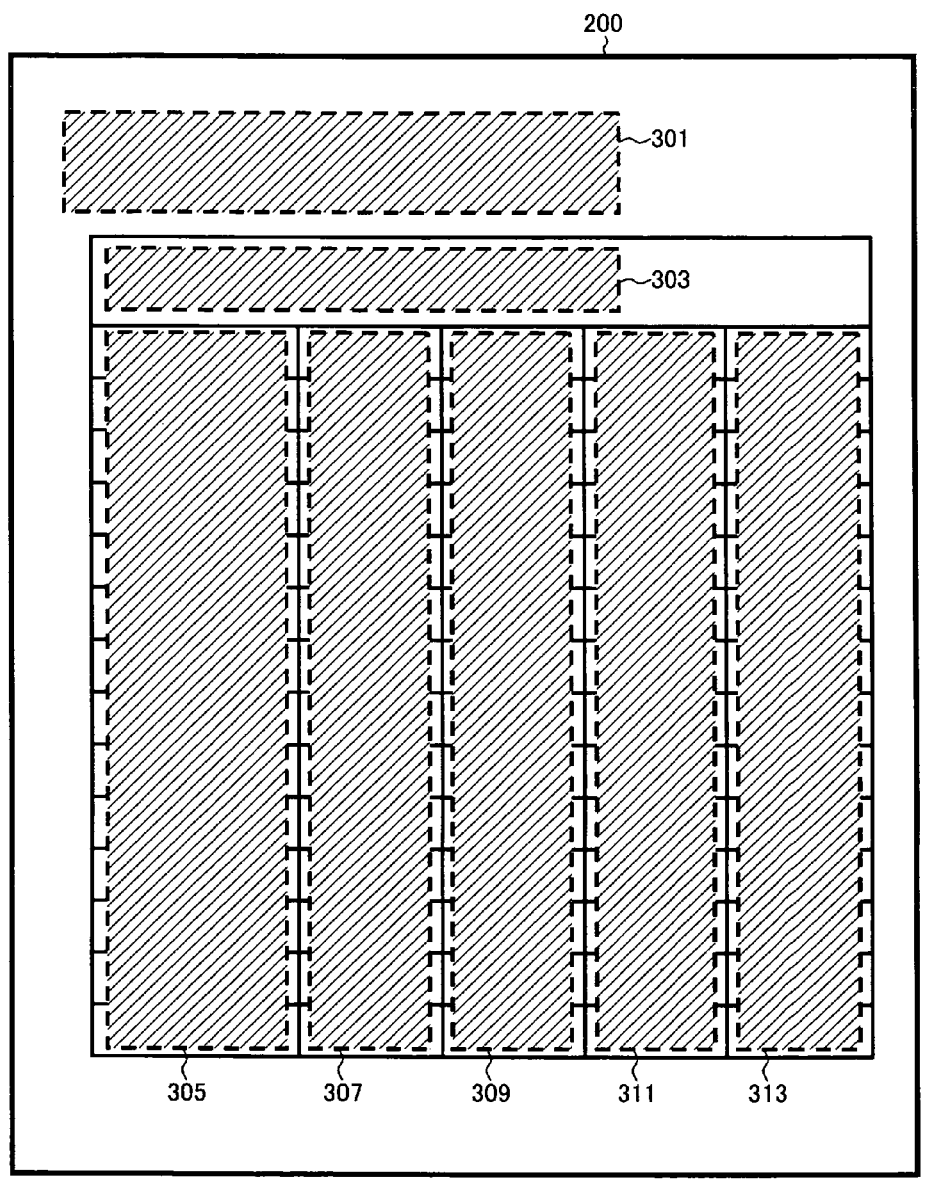

In addition, execution of the display processing in step S115 results as follows. For example, if the display level set in the screen in FIG. 16 is set in the format for each area included in the region as shown in the screen in FIG. 15 as the condition for non-display and/or display of the designation region as in FIG. 17 and when the non-operation period attains to 10 seconds, as shown in FIG. 23, regions 307, 311 and 313 designated as area 3 and area 5 for which corresponding display level 3 has been set are displayed in an invisible manner. In addition, when the non-operation period attains to 15 seconds, as shown in FIG. 24, regions 303 and 309 designated as area 2 and area 6 for which corresponding display level 2 has been set are also displayed in an invisible manner. Moreover, when the non-operation period attains to 30 seconds, as shown in FIG. 25, regions 301 and 305 designated as area 1 and area 4 for which corresponding display level 1 has been set are also displayed in an invisible manner. Such display processing prevents the third party from seeing the information, in accordance with confidentiality of the region, even if the user temporarily leaves printing apparatus 1.

As solely the format location information is stored along with the image, memory capacity can be reduced as compared with the case where the format itself is stored.

[Second Embodiment]

An example in which image data is transmitted from printing apparatus 1 to a printing apparatus 3 between which wired or wireless connection has been established and the received image data is displayed on printing apparatus 3 will be described as a second embodiment.

Figure 26:
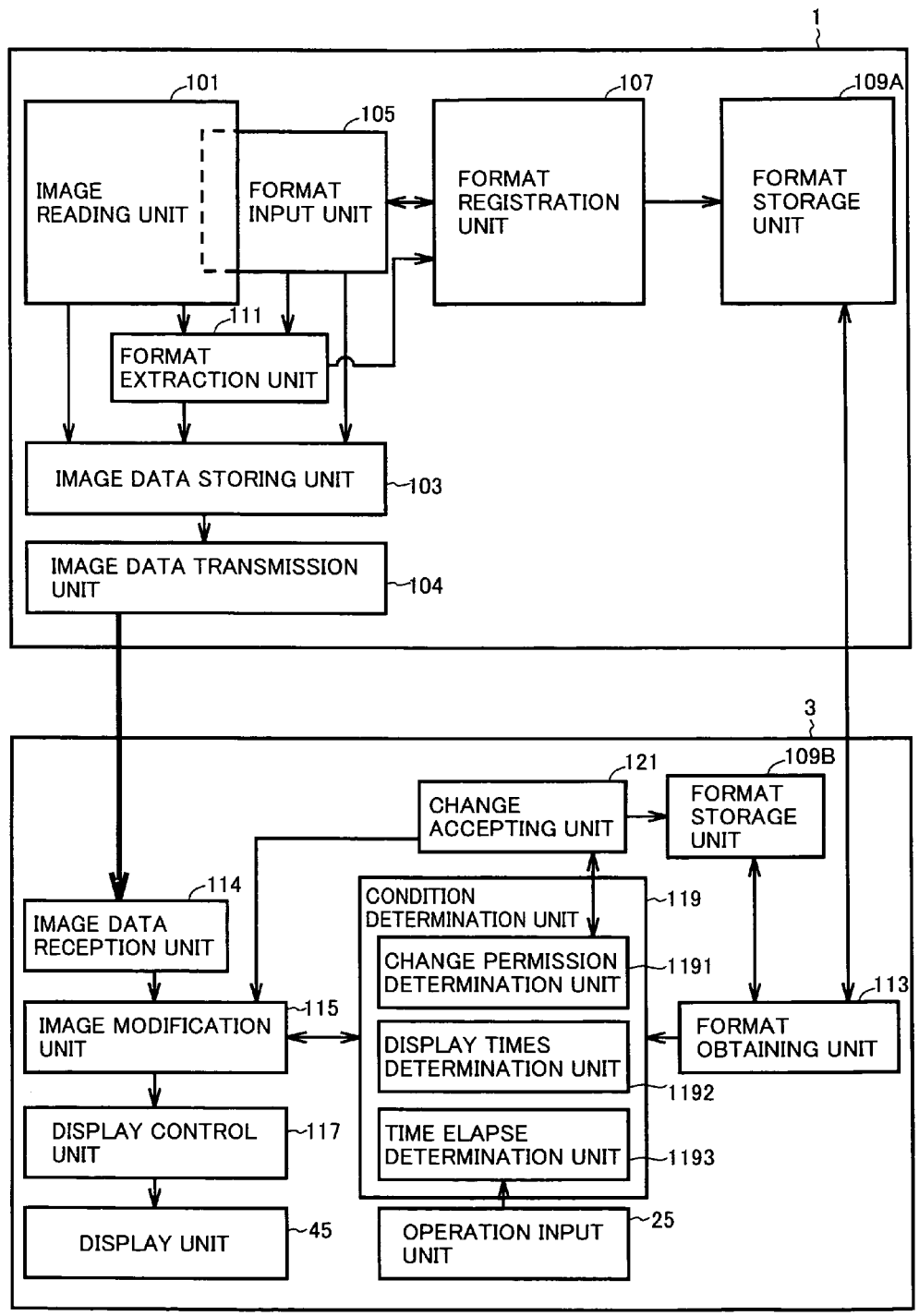
FIG. 26 is a block diagram showing a specific example of a functional configuration for controlling display of image data in printing apparatuses 1, 3 according to a second embodiment.

Referring to FIG. 26, as a functional configuration for controlling display of the image data in printing apparatuses 1 and 3, printing apparatus 1 on the transmission side includes image reading unit 101, image data storing unit 103, format input unit 105, format registration unit 107, format storage unit 109 (represented as a format storage unit 109A here), and format extraction unit 111 out of the functional configuration shown in FIG. 3, while printing apparatus 3 on the reception side includes format storage unit 109 (represented as a format storage unit 109B here), format obtaining unit 113, image modification unit 115, display control unit 117, condition determination unit 119, and change accepting unit 121. In addition, printing apparatus 1 on the transmission side further includes an image data transmission unit 104 for transmitting the image data, and printing apparatus 3 on the reception side further includes an image data reception unit 114 for receiving the image data. The functional configuration shown in FIG. 3 may be implemented by a plurality of printing apparatuses as shown in the second embodiment, and the functional configuration of each printing apparatus in such a case is not limited to the configuration shown in FIG. 26. Namely, any function may be included in any printing apparatus.

In printing apparatus 1 on the transmission side, the processing shown in the flowchart in FIG. 3 is performed and the read image data is stored in image data storing unit 103 in association with the format location information. Thereafter, the image data and the format location information associated with the image data are transmitted from image data transmission unit 104 to printing apparatus 3.

In printing apparatus 3 on the reception side, the received image is subjected to the processing shown in the flowchart in FIGS. 20 to 22, and the image data is displayed on display unit 45 based on the format location information received together with the image data. The format is obtained from printing apparatus 1 on the transmission side by format obtaining unit 113, based on the format location information.

As a result of execution of such processing in printing apparatus 1 on the transmission side and printing apparatus 3 on the reception side, designation of the non-display region and/or the display region for display on the printing apparatus on the reception side can be made on the transmission side in transmitting the image data, and thus confidentiality of the image region in the transmitted image, of which confidentiality the transmission side desires to retain, can be retained in display on the printing apparatus on the reception side.

[Third Embodiment]

An example in which image data is displayed by using the format stored in a server connected through a wire or by radio will be described as a third embodiment.

Figure 27:
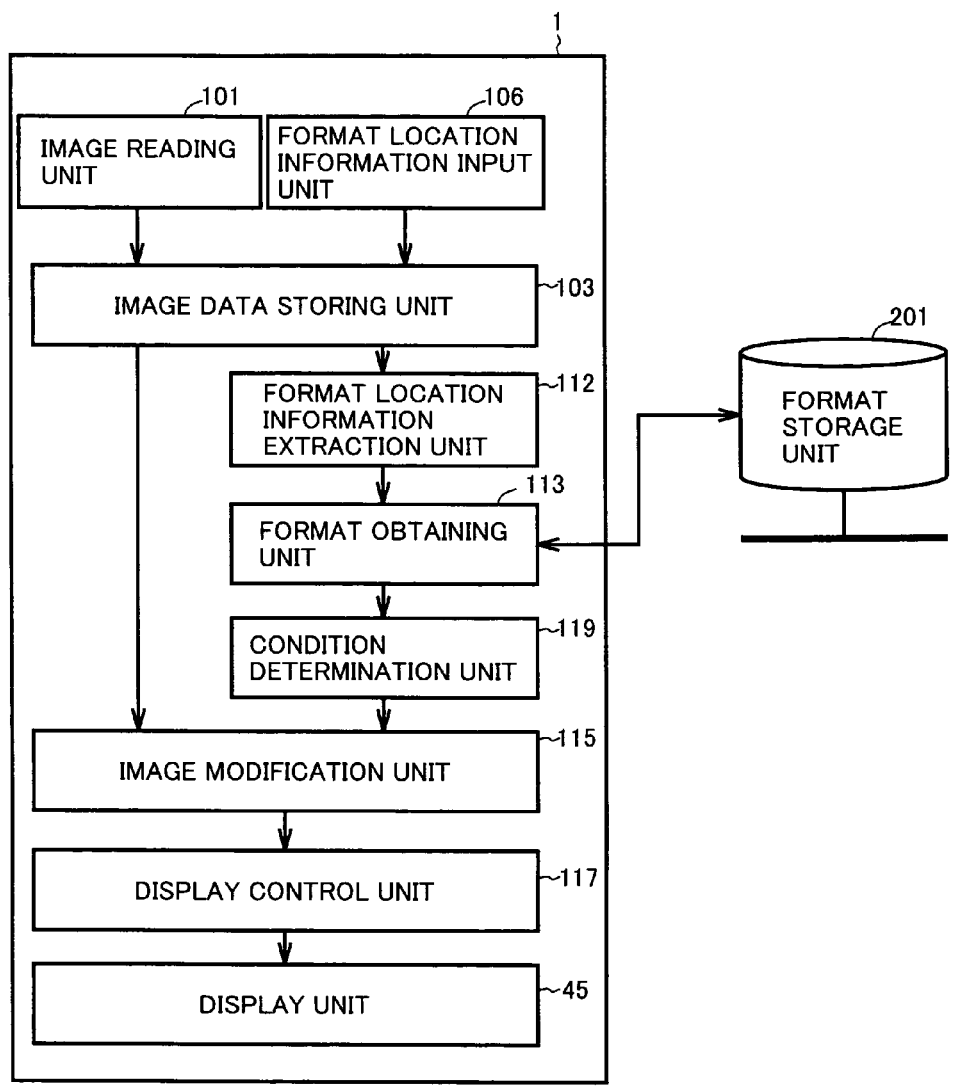
FIG. 27 is a block diagram showing a specific example of a functional configuration for controlling display of image data in printing apparatus 1 according to a third embodiment.

FIG. 27 extracts a portion particularly relevant to the third embodiment from the functional configuration shown in FIG. 3 for illustration.

Referring to FIG. 27, the function for controlling display of the image data in printing apparatus 1 according to the third embodiment is configured to include a format location information extraction unit 112 in addition to the functions in FIG. 3. In addition, a format location information input unit 106 is included instead of format location information input unit 110 in FIG. 3.

In the third embodiment, the format is stored in a format storage unit 201 included in a server connected to printing apparatus 1 through a wire or by radio. Format location information input unit 106 inputs the format location information indicating the location of the format on format storage unit 201, as the format to be set for the image data read in image reading unit 101. The input format location information is stored in image data storing unit 103 in association with the image data.

In displaying the image data on display unit 45, format location information extraction unit 112 extracts and obtains the format location information associated with the image data from image data storing unit 103, and inputs the same to format obtaining unit 113. In the third embodiment, format obtaining unit 113 accesses format storage unit 201 included in the server based on the format location information, obtains the format based on the specified location, and inputs the same to condition determination unit 119. Condition determination unit 119 determines the condition for non-display and/or display of the designated region as described above, and inputs the format to image modification unit 115 along with the result of determination.

In order to set the format to be used when the document is scanned and read for display on display unit 45 in printing apparatus 1 according to the third embodiment, in steps S11, S17 in the flowchart in FIG. 4, format location information input unit 106 inputs the location information indicating the location of the format to be set. In the third embodiment, in step S11, format location information input unit 106 presents the formats stored in an accessible external apparatus in the screen in FIG. 5 so as to allow selection. By accepting selection from among the formats, the information on access to the storage area where selected format has been stored is set for the image data as the format location information. The set format location information is stored in image data storing unit 103 in association with the image data in step S31.

Alternatively, the format newly created in steps S13, S15, and S23 to S27 is stored in format storage unit 201 of the server in step S27, and the information on access to the storage area where the format has been stored is stored in image data storing unit 103 in association with the image data as the format location information in step S31.

In the present embodiment, as shown in FIG. 19, the format location information is added to the image data as the pattern image such as a three-dimensional bar-code representing the format location information. Examples of the pattern image representing the format location information include a two-dimensional bar-code, a character string such as URL (Uniform Resource Locators), a mark, and the like, in addition to the three-dimensional bar-code.

Figure 28:
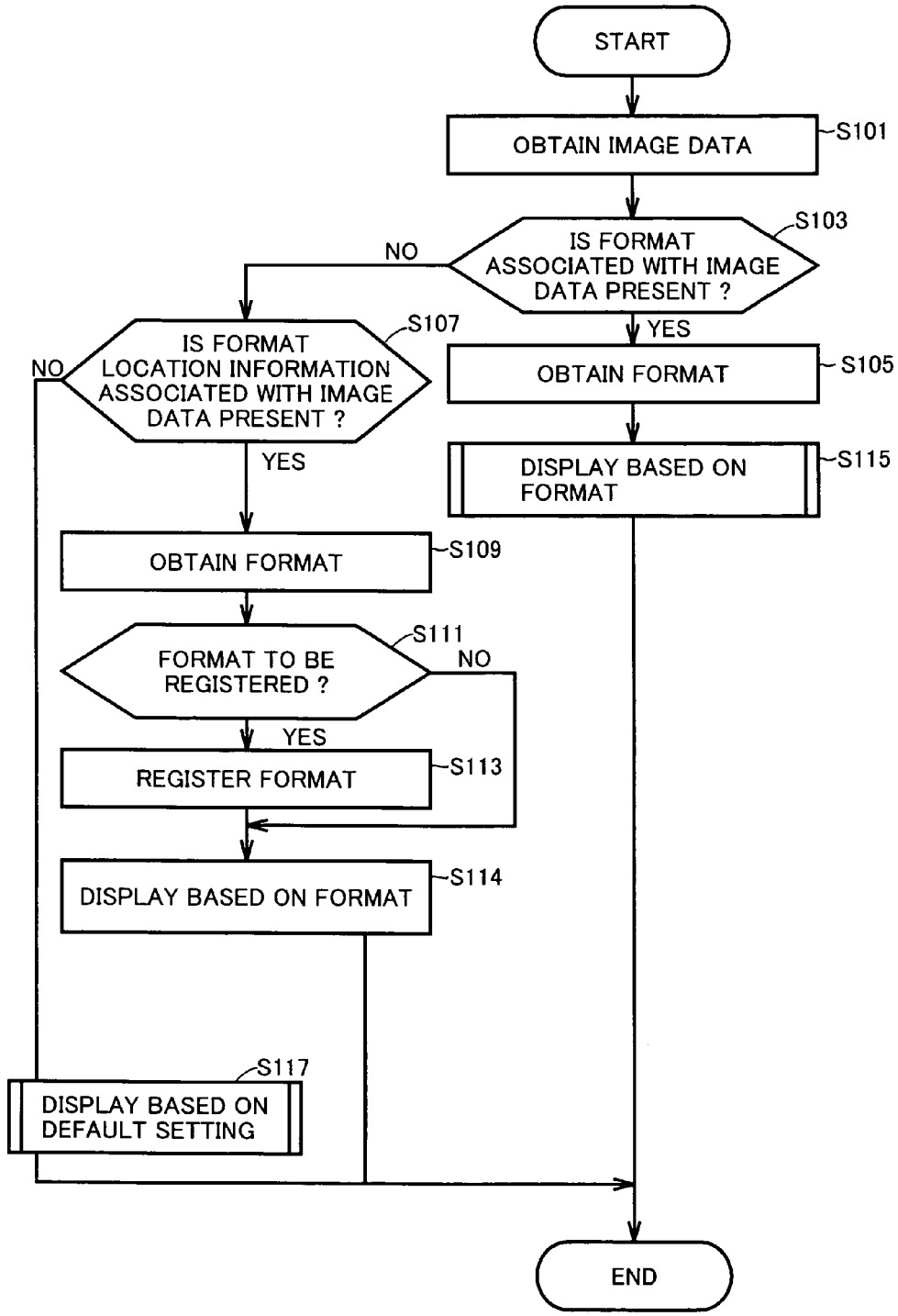
FIG. 28 is a flowchart illustrating processing for displaying image data in printing apparatus 1 according to the third embodiment.

The processing for displaying the image data on display unit 45 in printing apparatus 1, that is shown in the flowchart in FIG. 28, is also performed as a result of reading and execution of the program stored in storage unit 20 by CPU 10 of printing apparatus 1 and functioning of each unit shown in FIGS. 3 and 27. In FIG. 28, in addition to the processing in the first embodiment shown in FIG. 20, the processing in steps S107 to S114 is performed.

Referring to FIG. 28 for details, if format location information extraction unit 112 extracts the format location information from the displayed image data (YES in step S107), format obtaining unit 113 accesses format storage unit 201 included in the server based on the format location information and obtains the format (step S109). If the obtained format is to be registered in format storage unit 109 of printing apparatus 1 (YES in step S111), format registration unit 107 registers that format (step S113). Here, after change accepting unit 121 accepts change, the changed format may be registered. The image data is modified based on the obtained format and displayed on display unit 45 (step S114). The processing in step S114 is the same as that in step S115.

Figure 29:
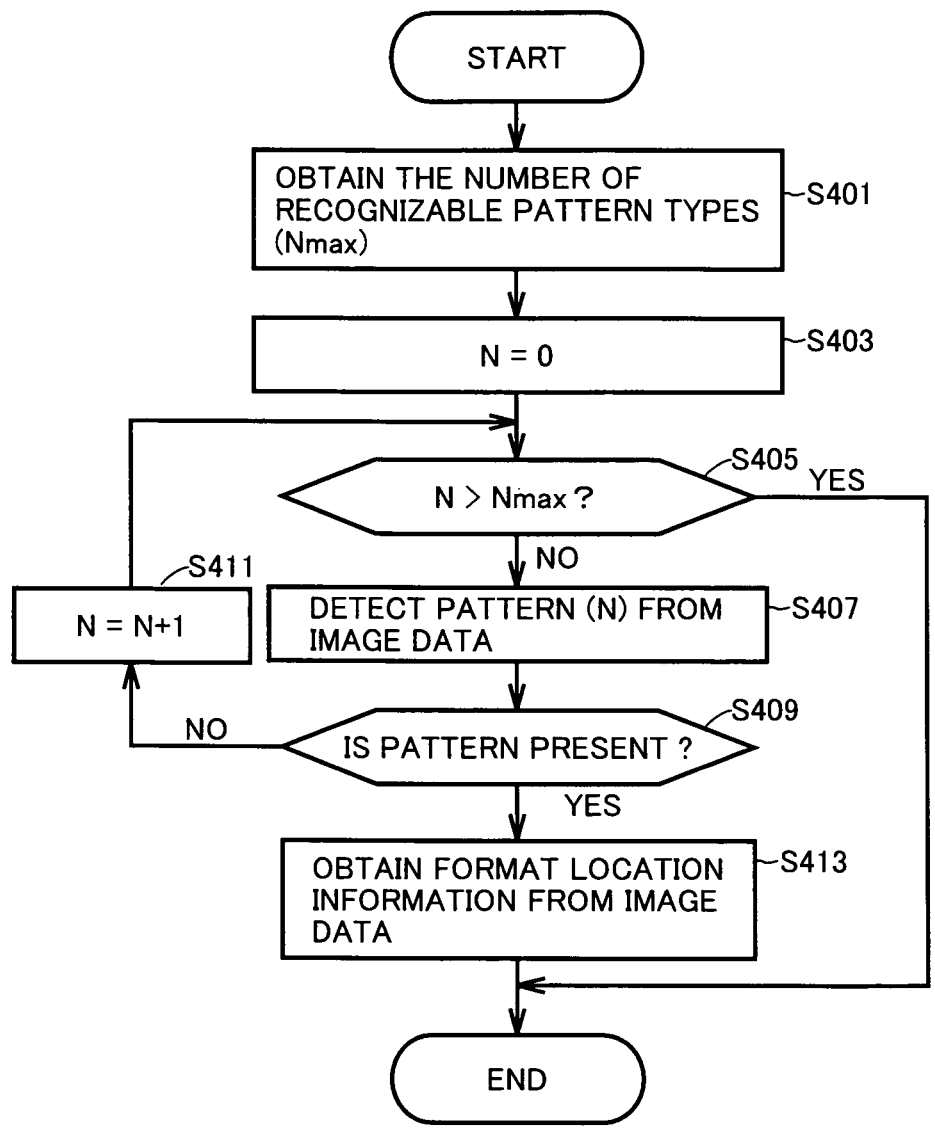
FIG. 29 is a flowchart illustrating processing for extracting format location information in step S107.

In addition, the flowchart in FIG. 29 illustrates the processing for extracting the format location information in step S107.

Referring to FIG. 29, initially, format location information extraction unit 112 retrieves attribute information stored in storage unit 20 or the like of printing apparatus 1, and obtains the number of types of the pattern recognizable in printing apparatus 1 (step S401). As described above, in the present embodiment, the format location information is represented as the three-dimensional bar-code, the two-dimensional bar-code and the like, and the pattern image representing the same is added to the image data. The three-dimensional bar-code, the two-dimensional bar-code, and the character string such as a URL is provided with a feature (pattern) allowing identification as the three-dimensional bar-code, the two-dimensional bar-code and the character string such as a URL. For example, the pattern image is recognized as the three-dimensional bar-code, because the pattern image includes squares in the upper right corner, the upper left corner and lower left corner within a square respectively. In addition, if a character string starting from a prescribed character string such as "http://" is detected, the character string can be recognized as the URL. In step S401, the number of types such as the three-dimensional bar-code that can be recognized in printing apparatus 1 by thus using the pattern is obtained by retrieving the attribute information.

Then, after initializing the counter for counting the number of types, that has been subjected to the following processing (step S403), format location information extraction unit 112 subjects the image data to pattern matching for each type (step S407). If the pattern image exhibiting the feature as described above is detected (YES in step S409), the format location information is obtained from the image data (step S413). If the pattern image is not detected (NO in step S409), the image data is subjected to pattern matching for a pattern that can be recognized next (steps S411, S407), which is repeated until the number of types of the recognizable pattern obtained in step S401 is reached (NO in step S405).

As a result of execution of such processing in printing apparatus 1 according to the third embodiment, the format not stored in the storage area of printing apparatus 1 can be used to set non-display of the region of high confidentiality in the image data. In addition, the non-display region and/or the display region can readily be set solely by setting the format, without performing a complicated operation for designating the non-display region and/or the display region. Moreover, by combining the third embodiment with the second embodiment, the format stored in the external apparatus can be set in transmitting the image data from the printing apparatus on the transmission side. In the printing apparatus on the reception side, the format is obtained by accessing the external apparatus based on the added format location information, and the image data can be displayed using that format. Thus, the image region of which confidentiality should be retained in displaying the image data on the reception side can be designated on the transmission side without increasing the data amount in transmission/reception of the image data.

Further, in the embodiment described above, it has been assumed that the processing above is executed in displaying the image data in the printing apparatus. Meanwhile, in handling general information including image data in an information processing apparatus such as a general personal computer or a portable phone, the processing above may be performed for output thereof.

A program executing the processing described above may also be provided. Such a program can be recorded on a computer-readable recording medium such as a flexible disk, a CD-ROM (Compact Disk-Read Only Memory), an ROM (Read Only Memory), an RAM (Random Access Memory), and a memory card adapted to a computer, and can be provided as a program product. Alternatively, the program may be recorded and provided in a recording medium such as a hard disk contained in the computer. Further, the program may be provided by downloading through the network.

The program according to the present invention may execute the processing by calling a necessary module out of program modules provided as a part of an operation system (OS) of the computer, in a prescribed sequence and at prescribed timing. In such a case, the program itself does not include the module above but executes the processing in cooperation with the OS. Such a program not including the module may be encompassed in the program according to the present invention.

Alternatively, the program according to the present invention may be provided in a manner incorporated as a part of another program. In such a case as well, the program itself does not include the module included in another program, but the program executes the processing in cooperation with another program. Such a program incorporated in another program may be encompassed in the program according to the present invention.

The provided program product is installed in a program storage unit such as a hard disk for execution. It is noted that the program product includes the program itself and the recording medium recording the program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image display apparatus, comprising:
    a reading unit for reading a document and obtaining image data, the image data comprising document image data to be displayed;
    a display unit for displaying said document image data;
    a setting unit for setting a format designating a type of the document image data, and comprising information defining characteristics of a non-display region, and a condition for the non-display region relating to a number of times said image data has been displayed in an invisible manner;
    a storage unit to store the format as data that is separate from the image data;
    a detection unit for detecting coordinates of the non-display region from the image data based on contents of the image data and the characteristics defined by said format;
    a modification unit for modifying said document image data such that said non-display region of said document image data is displayed in an invisible manner;
    a control unit for controlling the display unit to display said document image data modified by said modification unit; and
    an addition unit for adding to said image data format location information comprising information designating the storage unit storing said format.

2. The image display apparatus according to claim 1, wherein
    said setting unit selects said format from a plurality of formats stored in said storage unit.

3. The image display apparatus according to claim 1, wherein said setting unit sets said format by designating a region in said image data.

4. The image display apparatus according to claim 1, wherein
    said addition unit adds an image representing said format location information to said image data.

5. The image display apparatus according to claim 4, wherein
    said image representing said format location information includes a pattern specific to the type of said document image.

6. The image display apparatus according to claim 1, wherein
    said region includes a first region and a second region, and
    said condition includes a first condition for non-display of said first region and a second condition for non-display of said second region.

7. The image display apparatus according to claim 1, wherein
    said setting unit further sets whether change of said format is permitted.

8. An image display method in an image display apparatus including a display unit, comprising the steps of:
    reading a document and obtaining image data, the image data comprising document image data to be displayed;
    setting a format comprising information designating a type of the document image data and defining characteristics of a non-display region, and a condition for the non-display region relating to a number of times said image data has been displayed in an invisible manner;
    storing the format in a storage unit, wherein the format is not saved as part of the image data;
    detecting coordinates of the non-display region from the document image data based on contents of the document image data and the characteristics defined by said format;
    modifying said document image data such that said region of said non-display document image data is displayed in an invisible manner;
    controlling the display unit to display modified said document image data; and
    adding to said document image data format location information comprising information designating a storage unit storing said format.

9. A non-transitory computer-readable recording medium recording a program causing a computer to carry out control of display of image data in an image display apparatus including a display unit, the program causing the computer to execute the steps of:
    reading a document and obtaining image data, the image data comprising document image data to be displayed;
    setting a format comprising information designating a type of the document image data and defining characteristics of a non-display region, and a condition for the non-display region relating to a number of times said image data has been displayed in an invisible manner;
    storing the format in a storage unit, wherein the format is not saved as part of the image data;
    detecting coordinates of the non-display region from the document image data based on contents of the document image data and the characteristics defined by said format;
    modifying said document image data such that said region of said non-display image data is displayed in an invisible manner;
    controlling the display unit to display said modified document image data; and
    adding to said document image data format location information comprising information designating a storage unit storing said format.

10. An image display apparatus, comprising:
    a reading unit reading a document and obtaining image data, the image data comprising document image data to be displayed;
    a first obtaining unit obtaining format location information from said document image data, said format location information designating a storage unit which stores a format for modifying said document image data;
    a second obtaining unit obtaining said format based on said format location information, said format designating a type of the document image data and defining characteristics of a non-display region, and a condition for the non-display region relating to a number of times said image data has been displayed in an invisible manner;
    a storage unit to store the format as data that is separate from the image data;
    a detection unit detecting coordinates of the non-display region from the document image data based on contents of the document image data and the characteristics defined by said format;
    a display unit displaying said document image data;
    a modification unit modifying said document image data such that said non-display region of said document image data is displayed in an invisible manner; and
    a control unit controlling the display unit to display said document image data modified by said modification unit.

11. The image display apparatus according to claim 10, wherein said storage unit is provided in an external apparatus, and
said second obtaining unit obtains said format by accessing said external apparatus.

12. The image display apparatus according to claim 10, wherein
an image representing said format location information which is information designating said storage unit storing said format is added to said document image data,
said image representing said format location information includes a pattern specific to the type of said document image data, and
said first obtaining unit subjects said image data to pattern matching using said pattern, extracts said image representing said format location information, and obtains said format location information.

13. An image display method in an image display apparatus including a display unit, comprising the steps of:
reading a document and obtaining image data, the image data comprising document image data to be displayed;
obtaining format location information from said document image data, said format location information designating a storage unit which stores a format for modifying said document image data;
obtaining said format based on said format location information, said format designating a type of the document image data and defining characteristics of a non-display region, and a condition for the non-display region relating to a number of times said image data has been displayed in an invisible manner;
storing the format in a storage unit, wherein the format is not saved as part of the image data;
detecting coordinates of the non-display region from the image data based on contents of the document image data and the characteristics defined by said format;
modifying said document image data such that said non-display region of said image data is displayed in an invisible manner; and
controlling the display unit to display said document image data modified in said modifying step.

14. A non-transitory computer-readable recording medium recording a program causing a computer to carry out control of display of image data in an image display apparatus including a display unit, the program causing the computer to execute the steps of:
reading a document and obtaining image data, the image data comprising document image data to be displayed;
obtaining format location information from said document image data, said format location information designating a storage unit which stores a format for modifying said document image data;
obtaining said format based on said format location information, said format designating a type of the document image data and defining characteristics of a non-display region, and a condition for the non-display region relating to a number of times said image data has been displayed in an invisible manner;
storing the format in a storage unit, wherein the format is not saved as part of the image data;
detecting coordinates of the non-display region from the document image data based on contents of the document image data and the characteristics defined by said format;
modifying said document image data such that said non-display region of said document image data is displayed in an invisible manner; and
controlling the display unit to display said document image data modified in said modifying step.

15. An image display apparatus, comprising:
a reading unit reading a document and obtaining image data;
a display unit displaying said image data;
a setting unit setting a format comprising information defining characteristics of a non-display region;
a detection unit detecting coordinates of the non-display region from the image data based on contents of the image data and the characteristics defined by said format;
a modification unit modifying said image data such that said non-display region of said image data is displayed in an invisible manner;
a control unit controlling the display unit to display said image data modified by said modification unit; and
an addition unit adding to said image data format location information comprising information designating a storage unit storing said format,
wherein said setting unit further sets a condition for non-display of said region, said condition including a first condition relating to a time elapsed from a first operation to a next second operation in an operation input unit and a second condition relating to a number of times said image data has been displayed with said region in the invisible manner.

* * * * *